US 9,248,788 B2

(12) United States Patent
Sekiguchi et al.

(10) Patent No.: US 9,248,788 B2
(45) Date of Patent: Feb. 2, 2016

(54) INFORMATION PROCESSING APPARATUS, OPERATING SYSTEM, AND OPERATING METHOD FOR INFORMATION PROCESSING APPARATUS

(71) Applicant: Clarion Co., Ltd., Saitama-shi, Saitama (JP)

(72) Inventors: Takaaki Sekiguchi, Tokyo (JP); Naoki Mori, Tokyo (JP); Atsushi Shimizu, Tokyo (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 14/149,173

(22) Filed: Jan. 7, 2014

(65) Prior Publication Data

US 2014/0200745 A1    Jul. 17, 2014

(30) Foreign Application Priority Data

Jan. 11, 2013  (JP) ................................. 2013-003266

(51) Int. Cl.
| | |
|---|---|
| B60R 16/023 | (2006.01) |
| G01C 21/36 | (2006.01) |
| G10L 15/22 | (2006.01) |
| H04M 3/493 | (2006.01) |

(52) U.S. Cl.
CPC ........ B60R 16/0231 (2013.01); G01C 21/3608 (2013.01); G10L 15/22 (2013.01); *G10L 2015/223* (2013.01); *H04M 3/4936* (2013.01)

(58) Field of Classification Search
CPC  B60R 16/0231; G01C 21/3608; G10L 15/22; G10L 2015/223; H04M 3/4936

USPC .......................................................... 701/2, 36
See application file for complete search history.

(56) References Cited

U.S. PATENT DOCUMENTS

| | | | |
|---|---|---|---|
| 5,592,385 A | 1/1997 | Katayama et al. | |
| 2008/0059195 A1 | 3/2008 | Brown | |
| 2010/0134242 A1* | 6/2010 | Ohta et al. | ..................... 340/5.1 |
| 2011/0254863 A1 | 10/2011 | Hoshino | |

FOREIGN PATENT DOCUMENTS

| | | | |
|---|---|---|---|
| EP | 1672320 A1 * | 6/2006 | |
| JP | 2010-130223 A | 6/2010 | |
| JP | 2011-219058 A | 11/2011 | |

* cited by examiner

*Primary Examiner* — Mary Cheung
*Assistant Examiner* — Brian P Sweeney
(74) *Attorney, Agent, or Firm* — Volpe and Koenig, P.C.

(57) ABSTRACT

An information processing apparatus for operating a vehicle, when the vehicle is running, and an application is instructed through voice. An in-running operation acceptance/denial list is produced, i.e., a list of words meaning an operation to be inhibited from being executed during the time when the vehicle is running. A command acceptance/denial executing portion of the onboard apparatus determines if the command corresponding to the content, which a user speaks, can be operated or not, during the time when the vehicle is running, by referring this list and a title of the command operable through voices included in the application, and when the vehicle is running, an execution of that command is instructed to an application controller portion, if being determined operable, by referring to a running condition of the vehicle, and if being determined inoperable, the execution of that command is not instructed to the application controller portion.

19 Claims, 23 Drawing Sheets

FIG.6

EQUIPMENT INFORMATION DB 250

| EQUIPMENT ID | AREA | ... |
|---|---|---|
| 1000 | JAPAN | ... |
| 2000 | US | ... |
| 3000 | EU | ... |
| : | : | |

251  252

USER INFORMATION DB 260

| USER ID | USED LANGUAGE | ... |
|---|---|---|
| AAA | JAPANESE | ... |
| BBB | ENGLISH | ... |
| CCC | ENGLISH | ... |
| : | : | |

261  262

230a
RESTRICTION RULE DB 230
RESTRICTION RULE (JAPAN)

| OPERATION ID | OPERATION ACCEPTANCE/DENIAL |
|---|---|
| OPE1 | DENIED |
| OPE2 | DENIED |
| OPE3 | ACCEPTED |
| : | : |

231  232

240a
INHIBITED WORD LIST DB 240
INHIBITED WORD LIST (JAPANESE)

| OPERATION ID | INHIBITED WORD | | |
|---|---|---|---|
| OPE1 | "REPRODUCE" | "STOP" | ... |
| OPE2 | "INPUT" | "TITLE" | ... |
| OPE3 | "RETURN" | "ADVANCE" | ... |
| : | : | : | : |

241  242

RESTRICTION RULE (EU)

| OPERATION ID | OPERATION ACCEPTANCE/DENIAL |
|---|---|
| OPE1 | DENIED |
| OPE2 | ACCEPTED |
| OPE3 | ACCEPTED |
| : | : |

DEFAULT RULE

| OPERATION ID | OPERATION ACCEPTANCE/DENIAL |
|---|---|
| OPE1 | DENIED |
| OPE2 | DENIED |
| OPE3 | DENIED |
| : | : |

INHIBITED WORD LIST (ENGLISH)

| OPERATION ID | INHIBITED WORD | | |
|---|---|---|---|
| OPE1 | "Play" | "Stop" | ... |
| OPE2 | "Input" | "Name" | ... |
| OPE3 | "Back" | "Prev" | ... |
| : | : | : | : |

FIG. 7

COMMAND LIST 210

| COMMAND TITLE | COMMAND IDENTIFIER |
|---|---|
| "REPRODUCE" | Btn1 |
| "STOP" | Btn2 |
| "RETURN" | Btn3 |

211   212

IN-RUNNING OPERATION ACCEPTANCE/DENIAL LIST 220

| COMMAND TITLE | COMMAND IDENTIFIER | OPERATION ACCEPTANCE/DENIAL |
|---|---|---|
| "REPRODUCE" | Btn1 | DENIED |
| "STOP" | Btn2 | DENIED |
| "RETURN" | Btn3 | ACCEPTED |

221   222   223

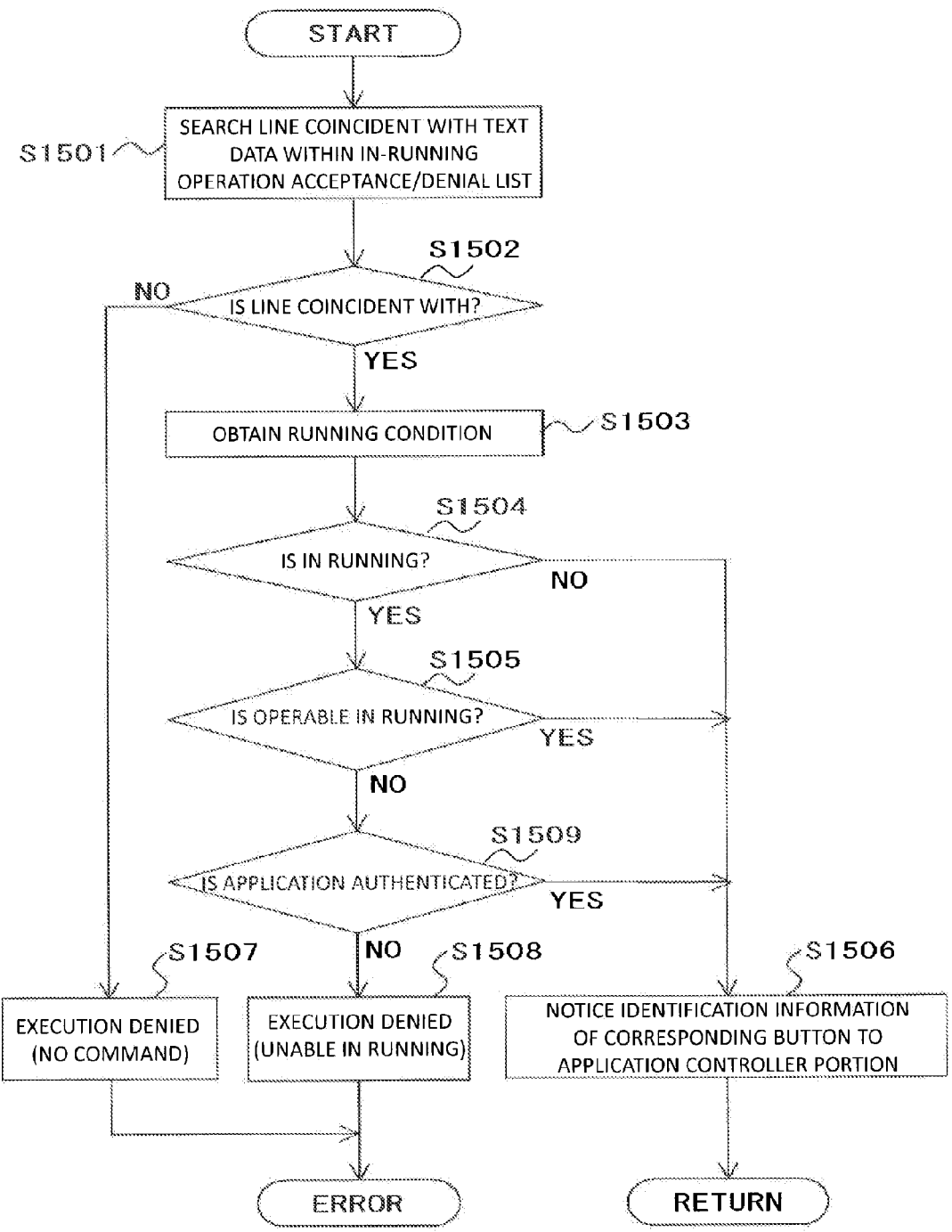

US 9,248,788 B2

INFORMATION PROCESSING APPARATUS, OPERATING SYSTEM, AND OPERATING METHOD FOR INFORMATION PROCESSING APPARATUS

This application relates to and claims priority from Japanese Patent Application No. 2013-003266 filed on Jan. 11, 2013, the entire disclosure of which is incorporated herein by reference.

BACKGROUND OF THE INVENTION

The present invention relates to an information processing apparatus, a sound operating system, and a sound or voice operating method for the information processing apparatus, and in particular, relates to an information processing apparatus, a sound operating system, and a sound operating method for the information processing apparatus, to be mounted on a vehicle, being suitable for conducting an operation of the vehicle with safety, when instructing an operation of an application through sounds during when the vehicle is running.

A car navigation system (hereinafter, also being called "an onboard apparatus") is that for processing map data therein, so as to provide guide information up to a destination to a user, i.e., a driver, etc. In particular, in recent years are developed an onboard apparatus for providing real-time traffic jam information while connection with a center system through communication, etc., via a portable telephone (e.g., a mobile phone), or an onboard apparatus, mounting a function for cooperating with Smartphone, which is rapidly spreads in recent years, and they are put into a practical use. As an example of the latter, there is already known such onboard apparatus that can provide information to the driver, effectively, on a screen much larger than that of the Smartphone, by displaying an output video of the application, which is executed on the Smartphone, on a screen of that onboard apparatus, through a wire cable, etc.

In general, in case of such equipments to be applied within the vehicle, such as, the onboard apparatus, etc., it is necessary that the equipment can be operated, with safety, by the driver during the time of driving the vehicle. For that reason, in the onboard apparatus is installed a process for suppressing a certain kind of operation and/or display of the information, during the time when the vehicle is running, for the purpose of protecting the driver in driving operation from being distracted in an attention.

For example, in the following Patent Document 1 is disclosed a technology for avoiding the driver from being attended to the screen of the onboard apparatus, by displaying the screen in a reduced size, in case of the application, to which no authentication information is given, while giving the authentication information to the application, a safety of which is confirmed during the running of the vehicle, for the purpose of maintaining the safety when the user execute various kinds of applications, which she/he bought freely, on the onboard apparatus.

Also, studies are made widely, on the technologies for operating the onboard apparatus, not restricting the operation of the driver, as is in the Patent Document 1, but through sounds or voices. For example, in the following Patent Document 2 is disclosed a technology for executing an application on a portable (e.g., mobile) terminal by means of an instruction made through the voices. With this technology, a table is held, which stores the information for indicating a title of a function executable and on whether it can be executed through the voices or not, wherein the voices generated by the driver are converted into a text, and if the text converted coincides with the title of the function, which is held in the table mentioned above, then the application corresponding thereto is executed.

PRIOR ART DOCUMENTS

Patent Documents

[Patent Document 1] Japanese Patent Laying-Open No. 2011-219058; and
[Patent Document 2] Japanese Patent Laying-Open No. 2010-130223.

BRIEF SUMMARY OF THE INVENTION

The display apparatus for use in vehicle of the Patent Document 1 of the conventional art mentioned above is devised for keeping the safety of driving the vehicle, by processing the screen display, even if executing a program, the safety of which is not guaranteed, and the Patent Document 2 discloses therein a system for enabling to operate the onboard apparatus, through the voices of the driver in her/his driving.

However, the technologies disclosed in the Patent Documents 1 and 2 mentioned above have the following problems.

First of all, in case of the technology described in the Patent Document 1, realistically, it is impossible to make confirmation upon the safety during the driving of the vehicle, for all of the applications available in the world. The operations and/or the contents of display of information to be restricted during the time of driving are defined, in each country or area, in the form of guidelines, and installing functions for following all of the guidelines of the each country and the area needs a lot of works. Conventionally, each of the onboard apparatuses makers installs the function for following the guidelines, for the application(s) developed by itself; however, realistically, it is impossible to do the same works for the applications, which are developed by the third parties.

Also, in case of the technology described in the Patent Document 2, there is a problem that the application can be operated through the voices, irrespective of the time of driving or not. For example, in case of an application for viewing/listening moving pictures, the moving pictures are reproduced through the operation of voices, irrespective of the time of driving or not, and this distracts the attention of the driver, i.e., a cause of reason of an accident. In the Patent Document 2 is disclosed a mechanism for the user to determine if the application can be executed or not (i.e., acceptance/denial), through the voices (see FIG. 5 and columns [0072]-[0075]); however, since the user can change the determination freely, therefore, this is not effective to the user who does not take the safety during the time of driving into the consideration. There can be also considered a means for determining the acceptance/denial of the operation through voices, not by the user, but by the onboard apparatus maker; however, because of the reason same to that in the Patent Document 1, it is impossible to define the acceptance/denial of the operation through voices by each of the onboard apparatus makers, upon the applications, which are developed by the third parties.

According to the present invention, being accomplished for dissolving such problems as mentioned above, an object thereof is to provide an information processing apparatus, being an onboard apparatus to be mounted on a vehicle, for enabling an operation of the vehicle, with safety, during the time when the vehicle is running, when an operation of an application is instructed through voices.

For dissolving such problems as mentioned above, according to the present invention, it is the most principle feature that a list of words meaning an operation undesirable to be executed during the time when the vehicle is running is produced, and thereby it is determined if the command corresponding to the content spoken by a user can be operated or not, during the time when the vehicle is running, by referring this list and a title of command operable through voices, being equipped with on each application. As a concrete example thereof, to the application for conducting reproduction of moving pictures when a user speaks "reproduce" through the voices, a list is produced, including "reproduce" therein, as a word of meaning the operation undesirable to be executed during the time when the vehicle is running, and thereby restricting "reproduce" from being executed through the voices during the time when the vehicle is running. Herein, the title of the command operable through the voices mentioned above is obtained from the titles, which are set on buttons, etc., displayed on a screen of the application, for example. In more details, in case where a button having the title "reproduce" is disposed on the screen, which the application displays, the title of the buttons included in the screen, with utilizing a property obtaining function, etc., of a GUI component, which an execution environment of the application provides, when that screen is displayed on the onboard apparatus, and this is memorized as the title of the command operable through the voices. In case where what is displayed on the button is not the text title, such as, "reproduce", etc., but is a mark meaning reproduction, then not the content of which is displayed, but an alternative text set on the button may be obtained, as the title of the command operable though the voices.

Also, according to the present invention, it is a second feature in that plural numbers of restriction rules, each being indicative if an operation is executable or not, during the time of running, are produced corresponding to guidelines of each of countries and areas, while producing plural numbers of lists of words indicative of operations undesired to be executed when the vehicle is running, corresponding to the languages, and wherein selection of which word list and which restriction rule should be applied, is made depending on an area where the onboard apparatus lies. For example, when restricting a reproduction operation, "reproduce" in Japanese is described in the list, if the language used by a user is Japanese, while "Play" is described in the list when the used language is English, and further, if execution of the reproduction operation is restricted in each country, i.e., in Japan and US, is also described as the restriction rule. The lists and the restriction rules of the inhibited words, for use of every languages and areas may be stored in the onboard apparatus, in advance, or may be stored in the policy distributing server, which is connected with the onboard apparatus through a communication network, so that the policy distributing server can respond an appropriate one depending on the information of the used language and the area, which is transmitted from the onboard apparatus, responding to the request from the onboard apparatus, in the structure thereof.

For achieving such function as was mentioned above, according to the present invention, there is provided an information processing apparatus, to be mounted on a vehicle, for conducting an operation of application software through voices, during time when said vehicle is running, comprising: an application controller portion, which is configured to execute said application software; a running condition obtaining portion, which is configured to obtain a running condition of said vehicle; a policy information recording portion, which is configured to record policy information, being information relating to operation, which is inhibited from being executed during the time when said vehicle is running; an in-running operation acceptance/denial list producing portion, which is configured to produce an in-running operation acceptance/denial list inductive of whether a command for said application software can be operated or not, during the time when said vehicle is running, by referring to said policy information and a list of command operated from said application software; an in-running operation acceptance/denial list recording portion, which is configured to record said in-running operation acceptance/denial list therein; a voice input portion, which is configured to input voice data, which a user speaks; a text converting portion, which is configured to analyze said voice data, so as to convert into text data; and a command execution acceptance/denial determining portion, which is configured to determine if the command spoken by said user can be operated or not, during the time when said vehicle is running, which is recorded as said text data, by referring to said text data and said in-running operation acceptance/denial list, wherein if being operable, instructing an execution of said command to said application controller portion, while being inoperable, not instructing the execution of said command to said application controller portion.

Also, the configuration of a policy distributing server comprises: a restriction rule recording portion, which is configured to record a restriction rule, being defined for each place where said information processing apparatus is used, to be applied to the command for operating said application software; an inhibited word list recording portion, which is configured to record inhibited word lists, being defined for languages, separately, in relation with the command of said restriction rule; a restriction rule selector portion, which is configured to select said restriction rule upon basis of information indicative of the place where said information processing apparatus is used; and an inhibited word list selector portion, which is configured to select the inhibited word list upon basis of information of the language used by the user.

And, an onboard apparatus transmits the equipment information and the user information to the policy distributing server.

The restriction rule selector portion of said policy distributing server selects said restriction rule, upon basis of said equipment information received from said information processing apparatus, the inhibited word list selector portion of said policy distributing server selects said inhibited word list, upon basis of said user information received from said information processing apparatus, and said policy distributing server transmits said restriction rule and said inhibited word list to said information processing apparatus, as the policy information.

According to the present invention, it is possible to provide the information processing apparatus, such as, an onboard apparatus to be mounted on a vehicle, etc., for enabling an operating of the vehicle, with safety, when operation of an application is instructed through the voices during the time when the vehicle is running.

BRIEF DESCRIPTION OF THE SEVERAL
VIEWS OF THE DRAWING

Those and other objects, features and advantages of the present invention will become more readily apparent from the following detailed description when taken in conjunction with the accompanying drawings wherein:

FIG. 6 is a view for showing the structure of a database, which is held by the policy distributing server 300;

Figure 8:
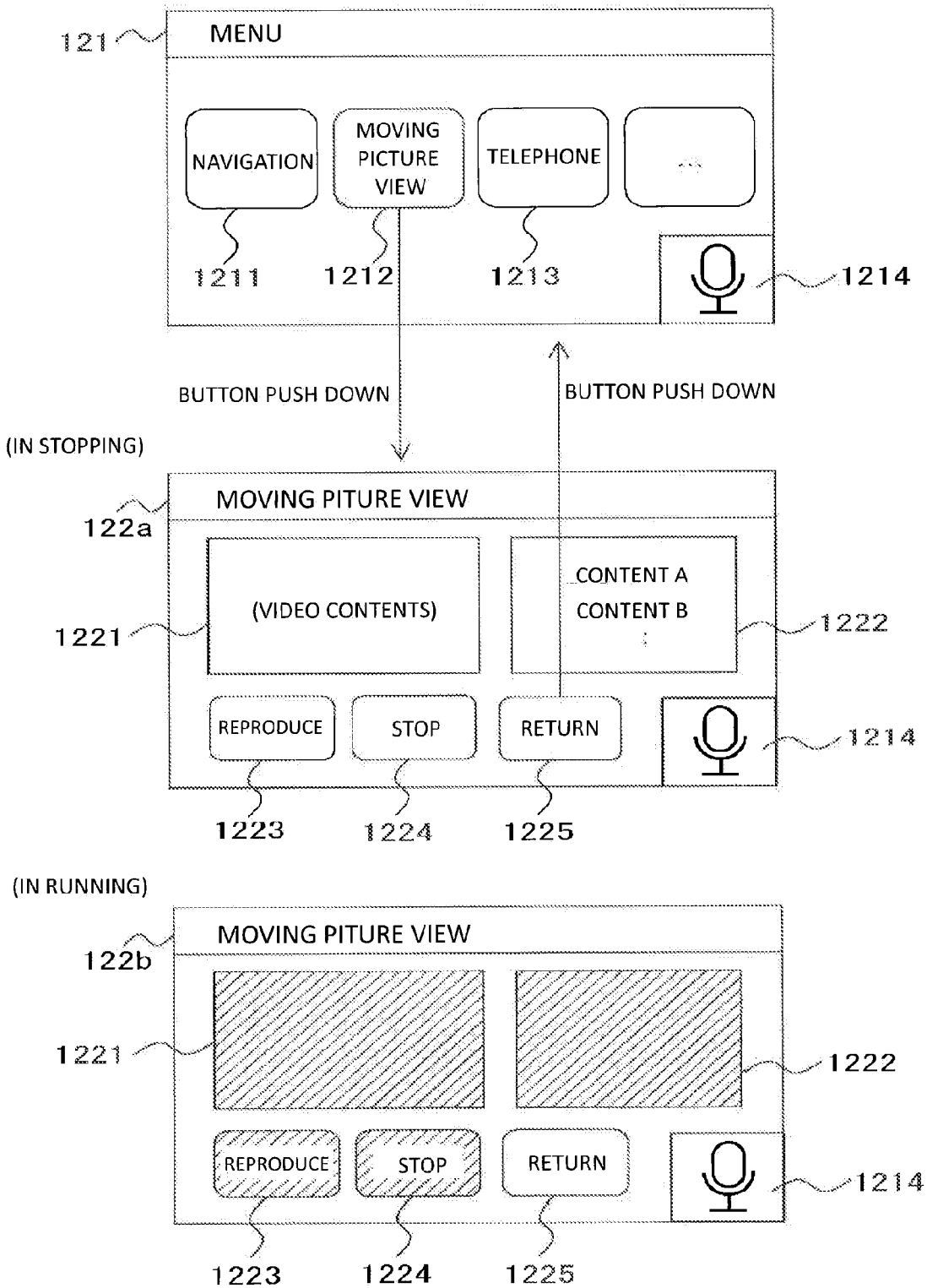
Figure 9:
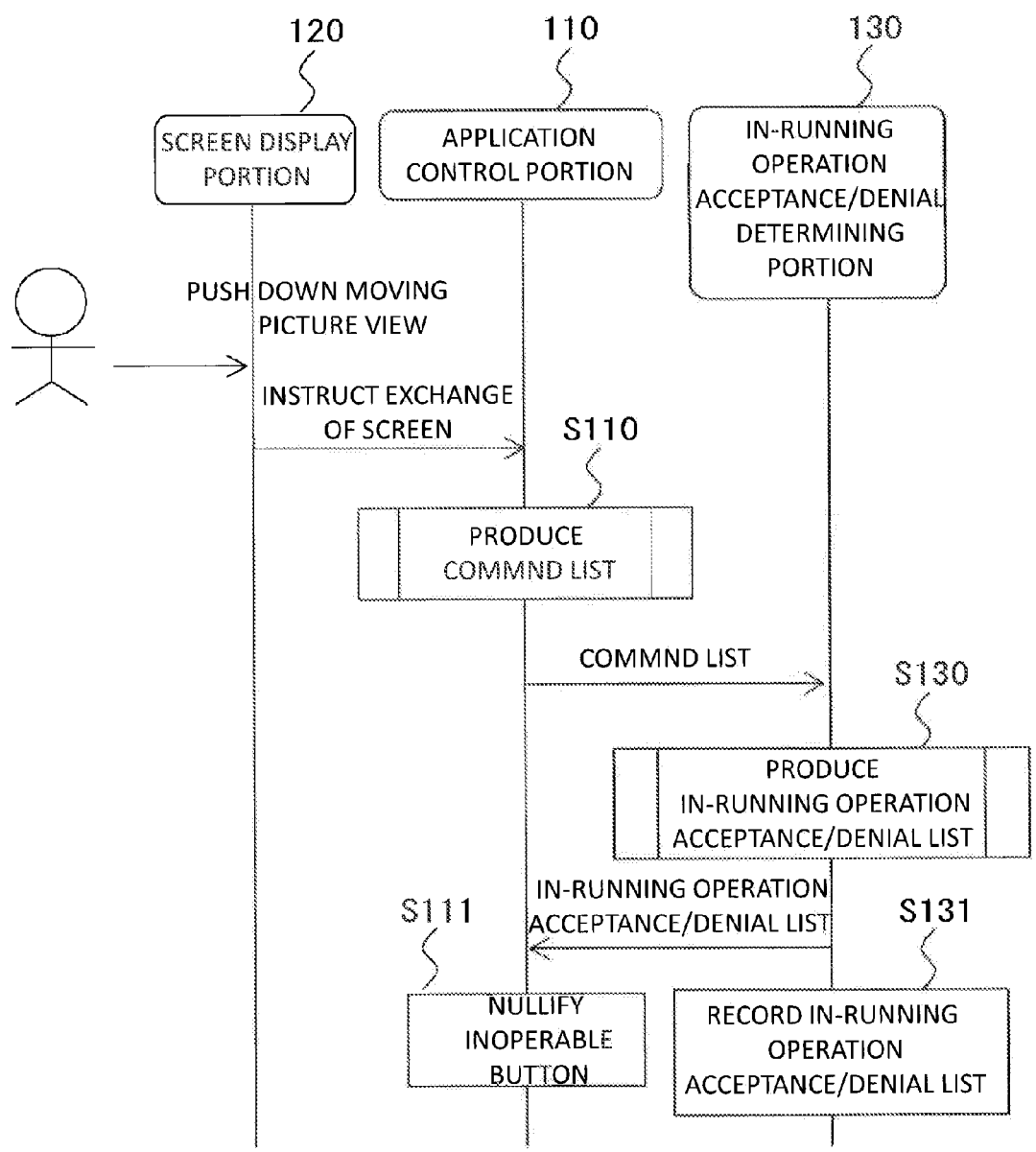
Figure 10:
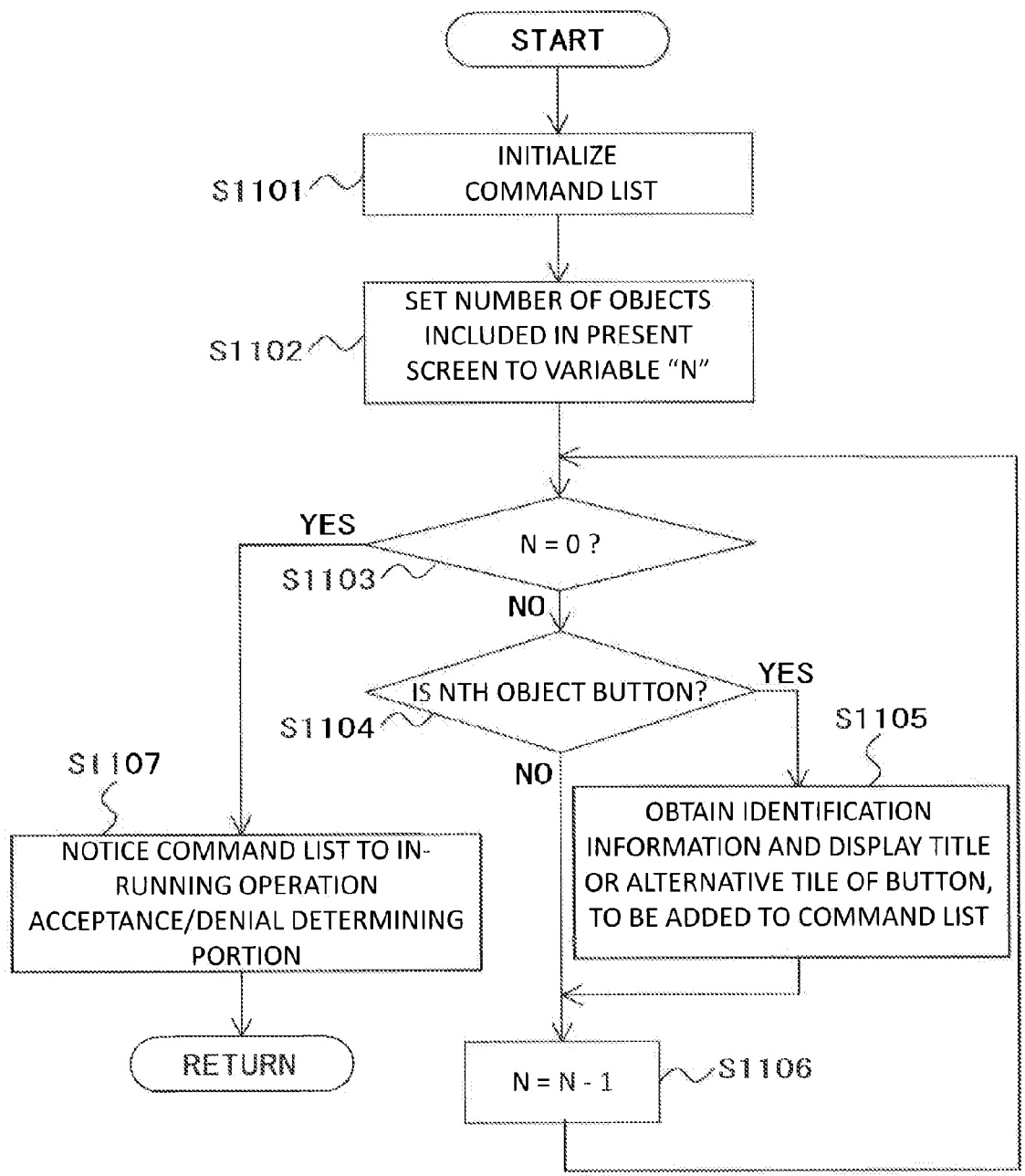
Figure 11:
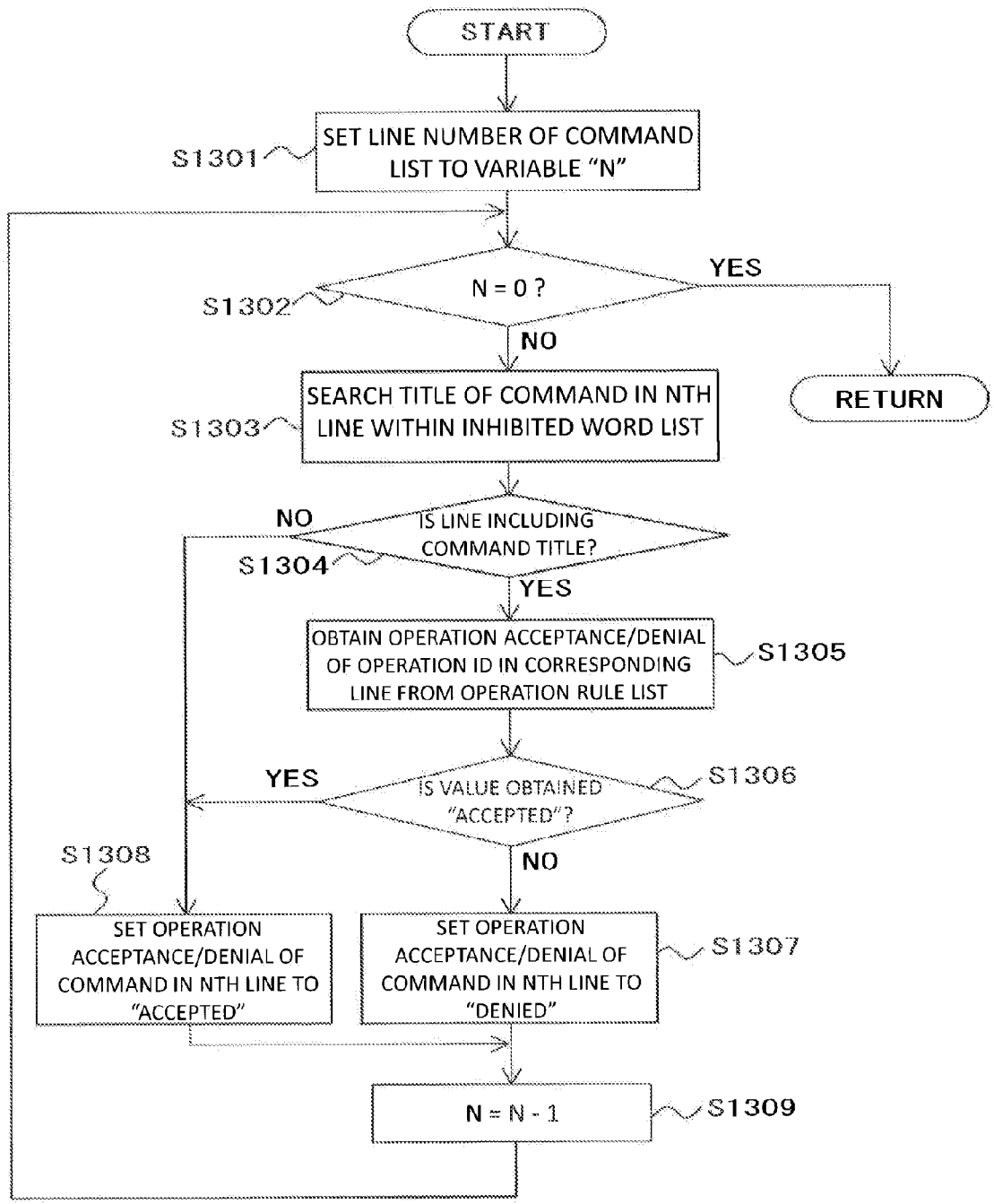
Figure 12:
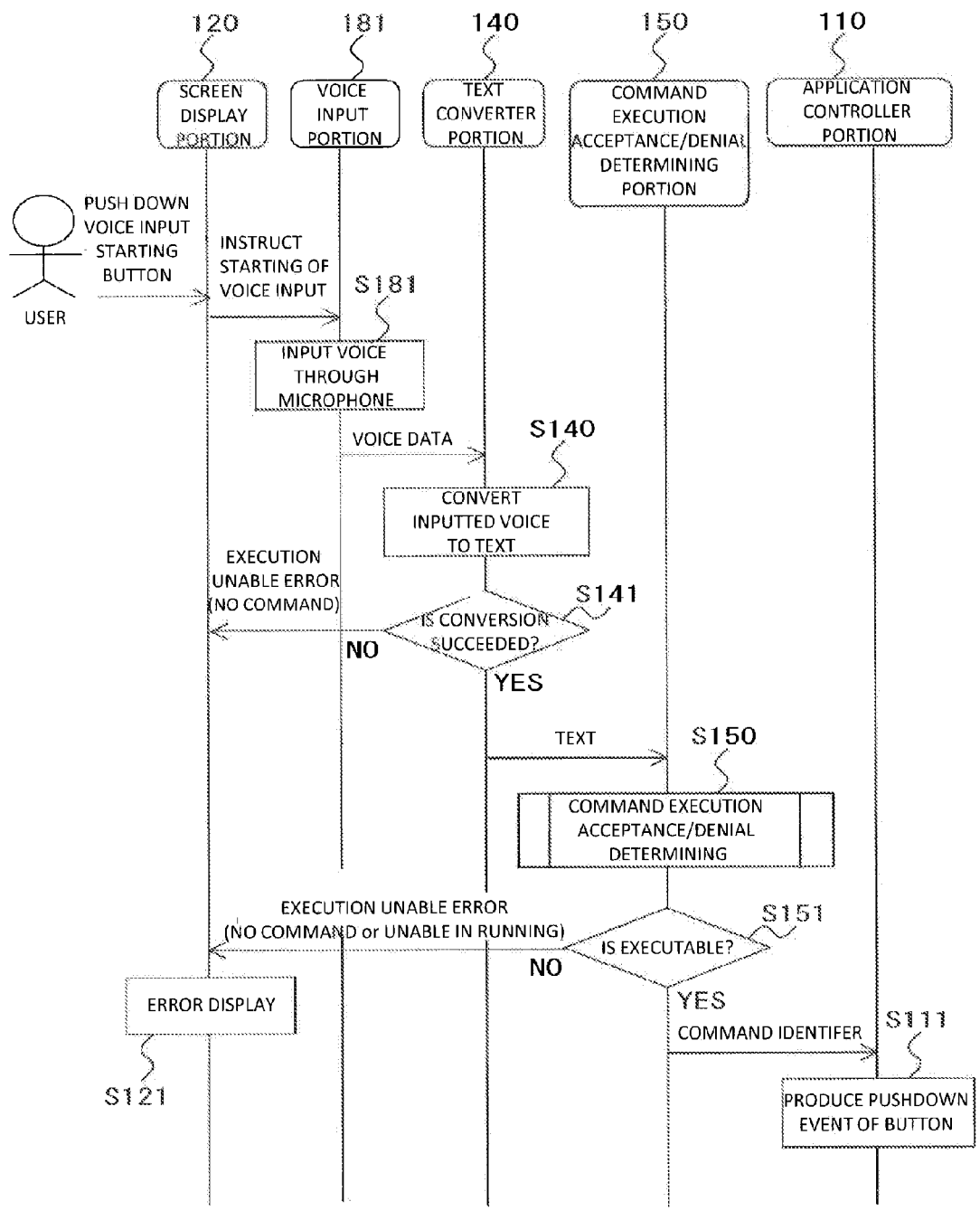
Figure 14A:
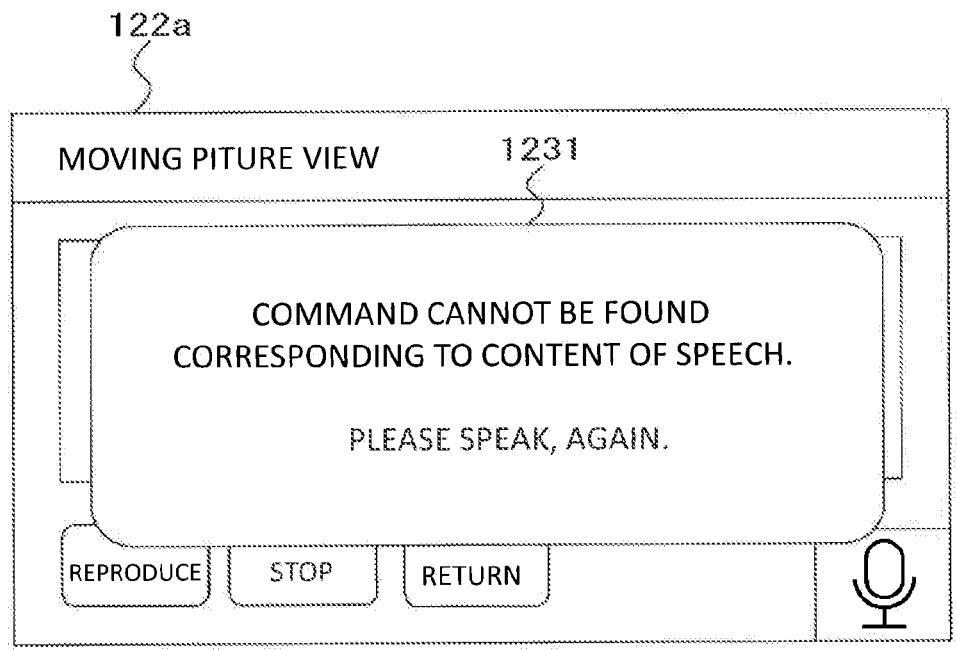
Figure 14B:
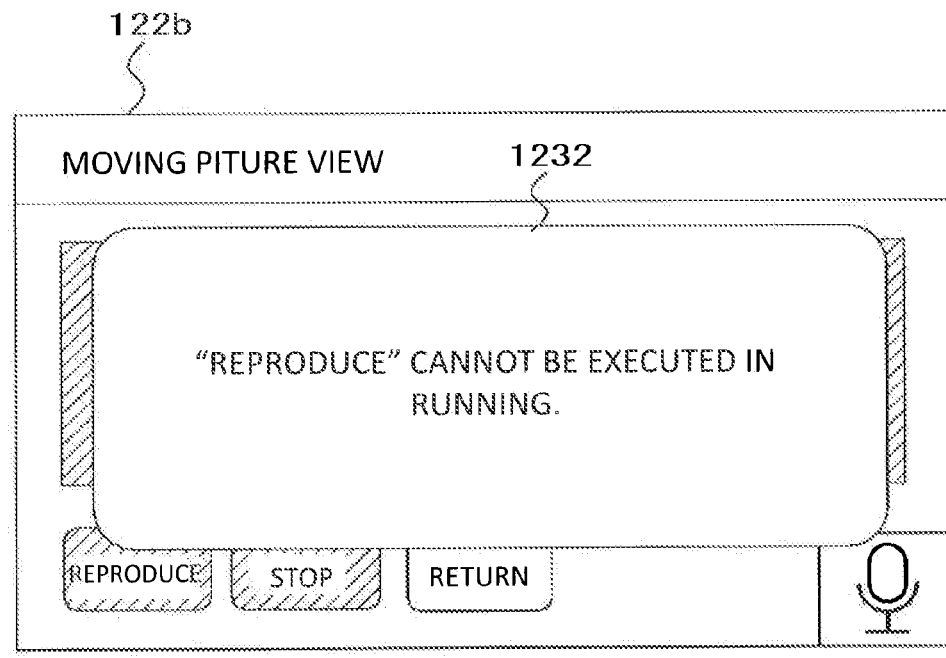
Figure 15:
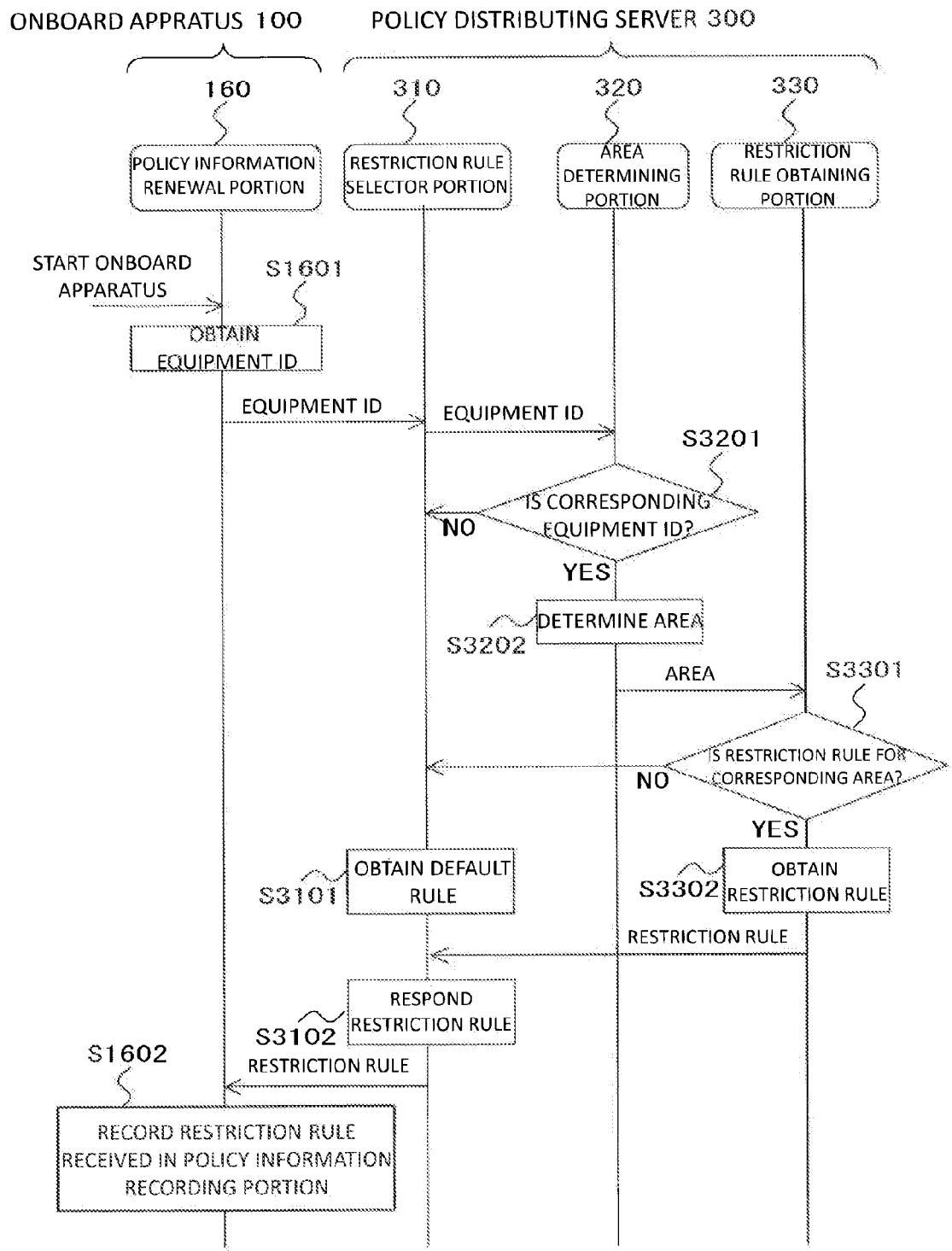
Figure 16:
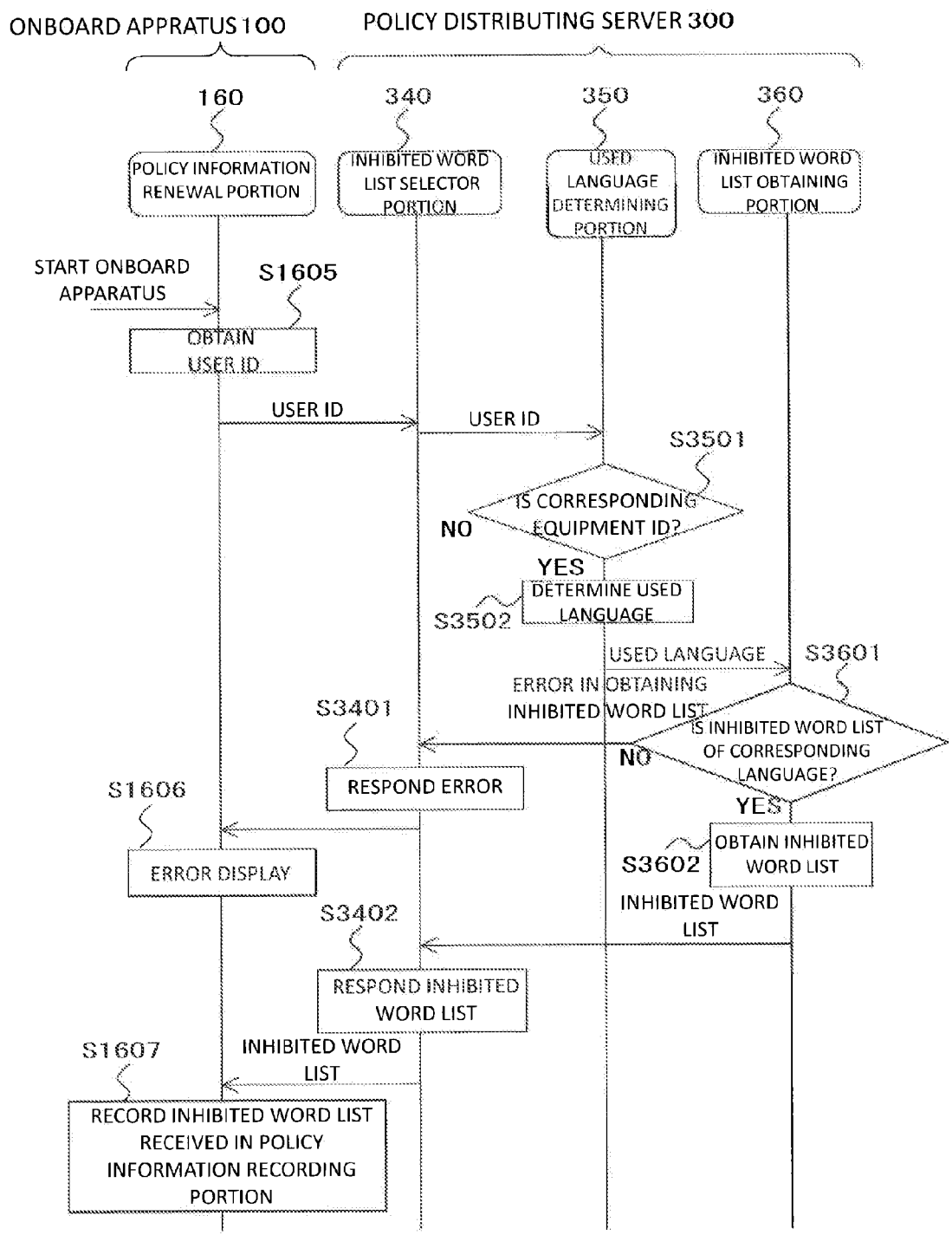
Figure 17:
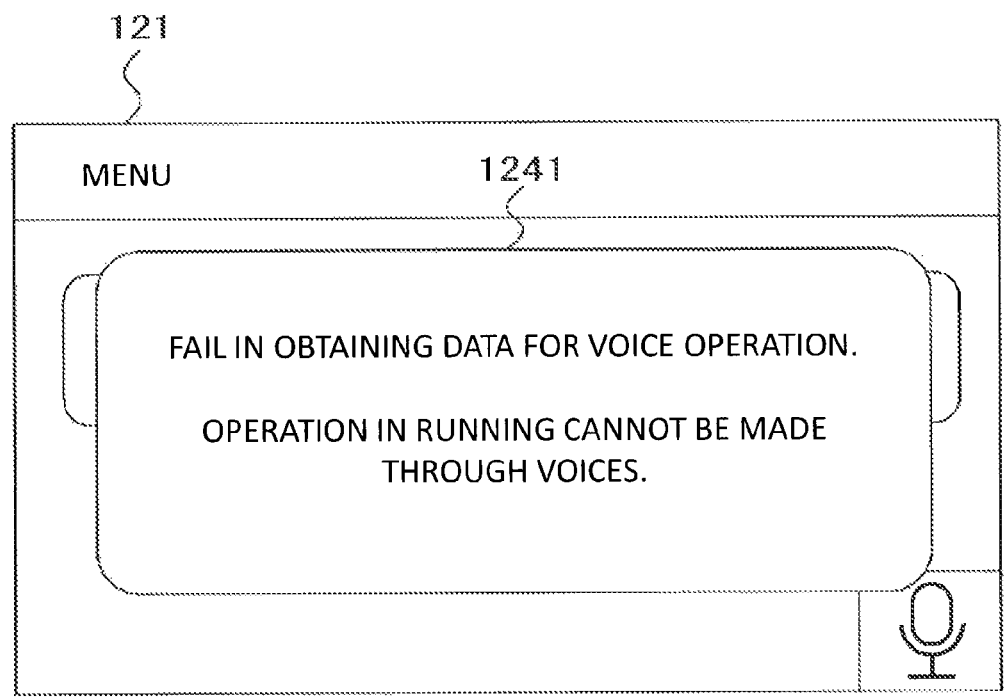
Figure 18:
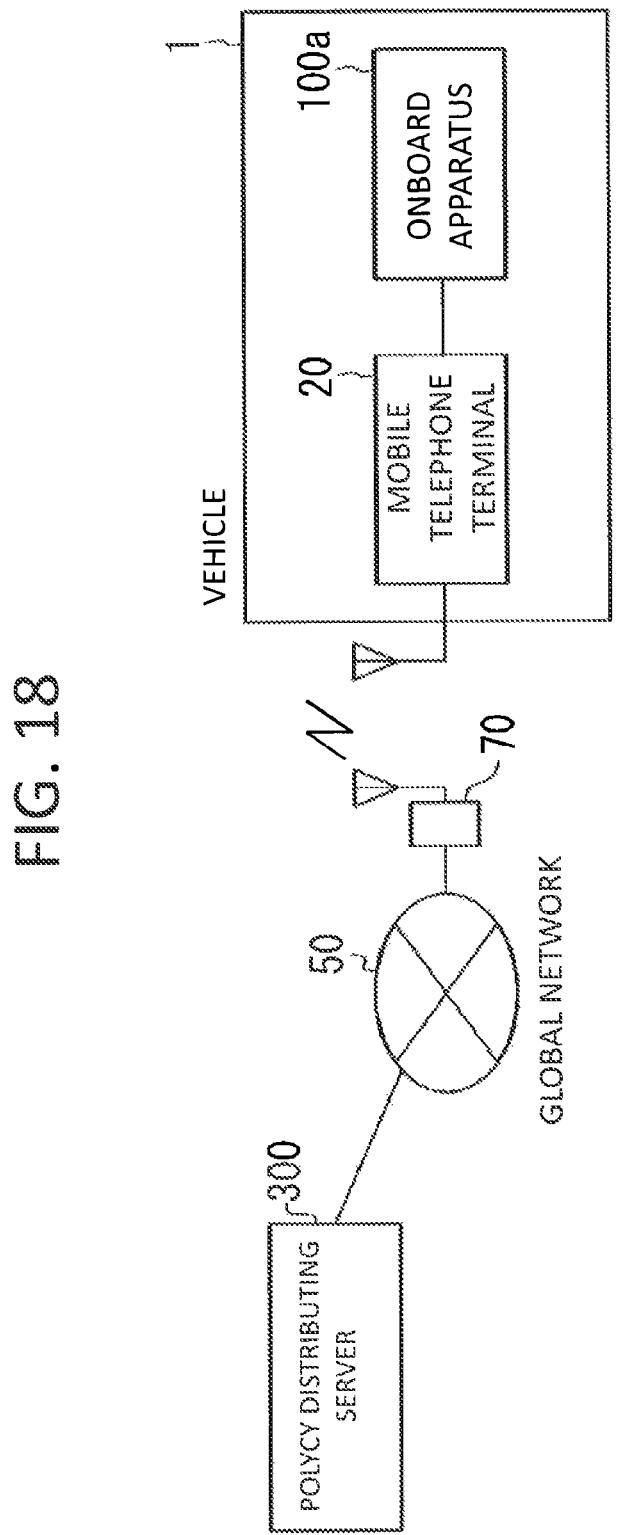
Figure 19:
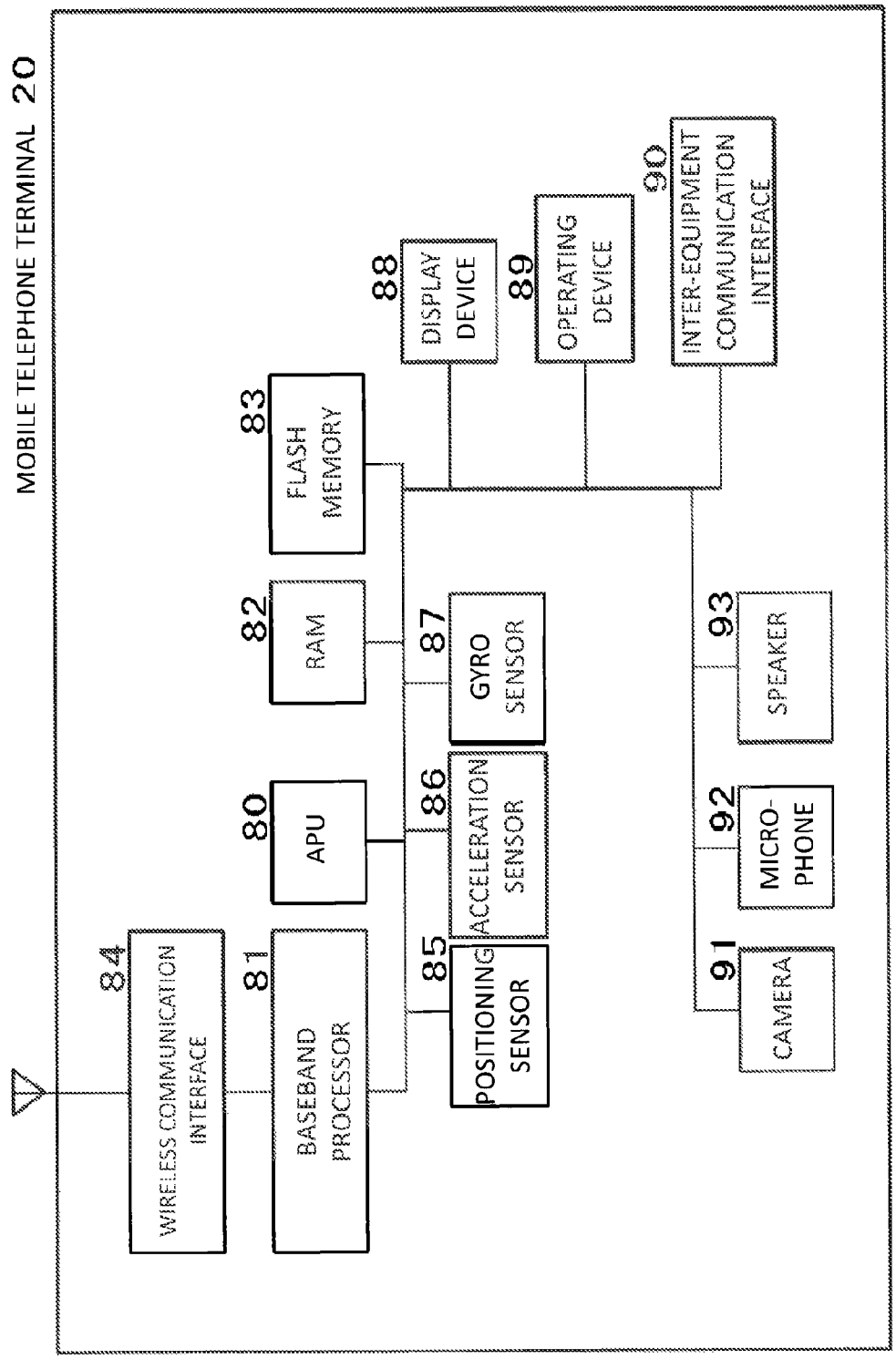
Figure 20:
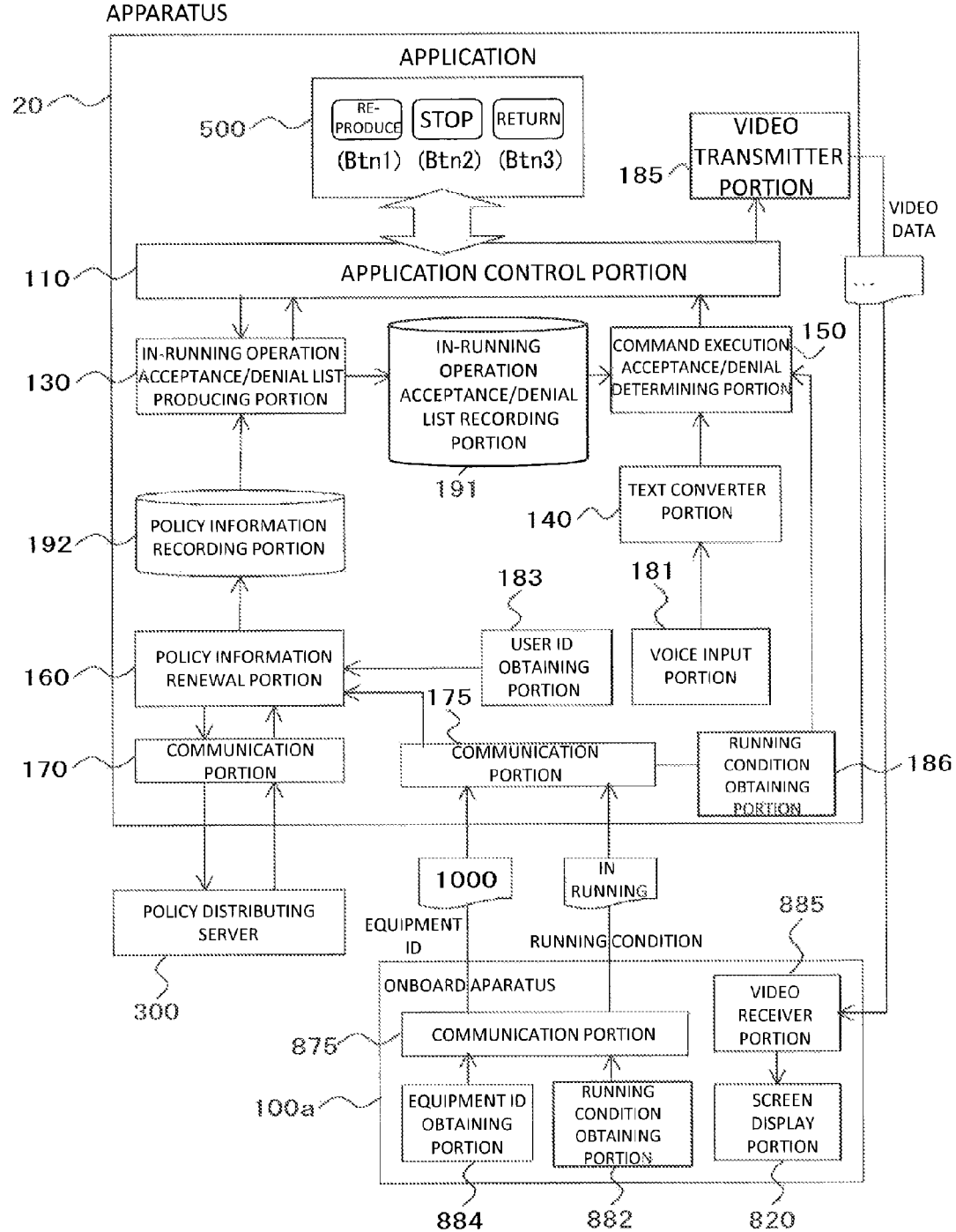
Figure 21:
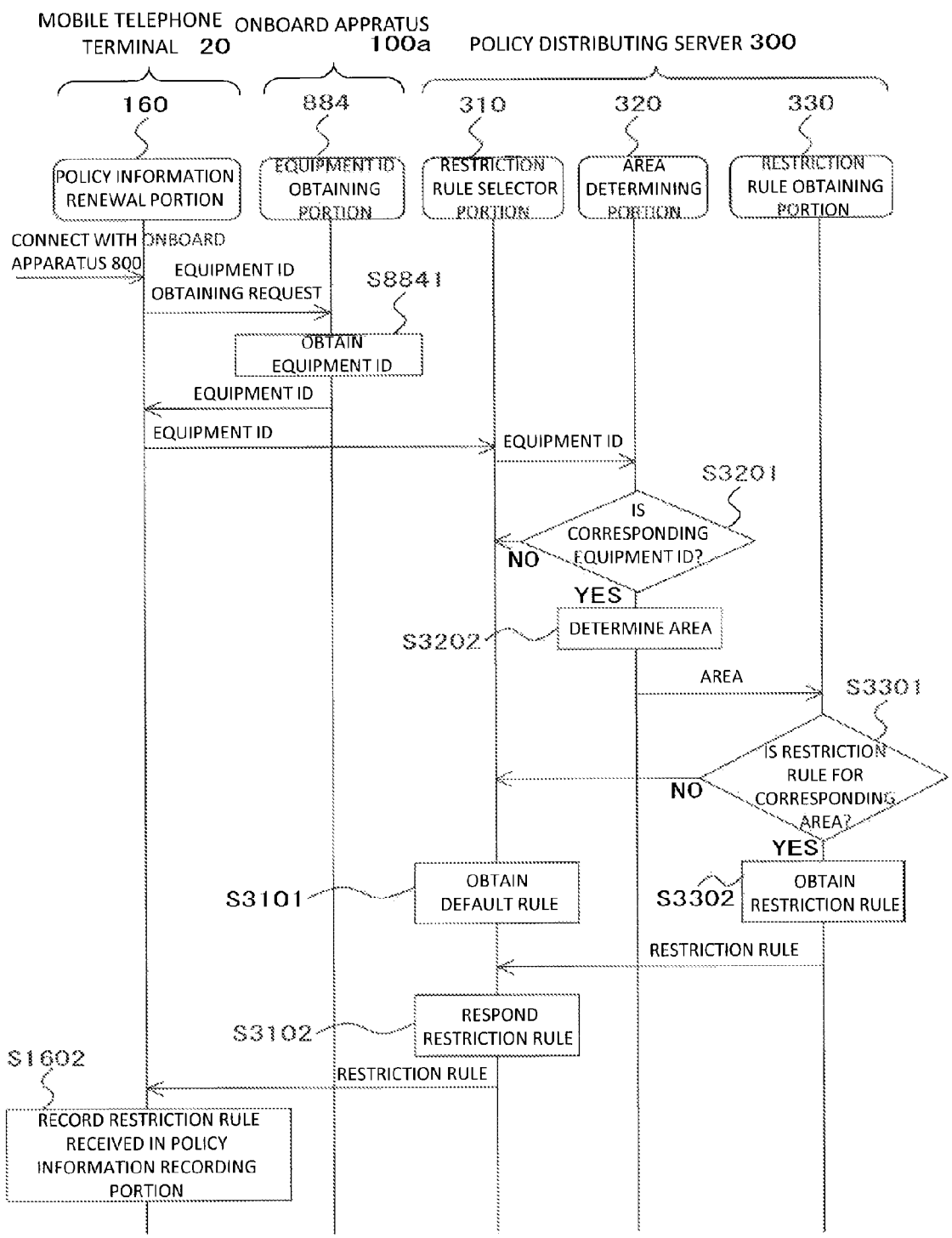
Figure 22:
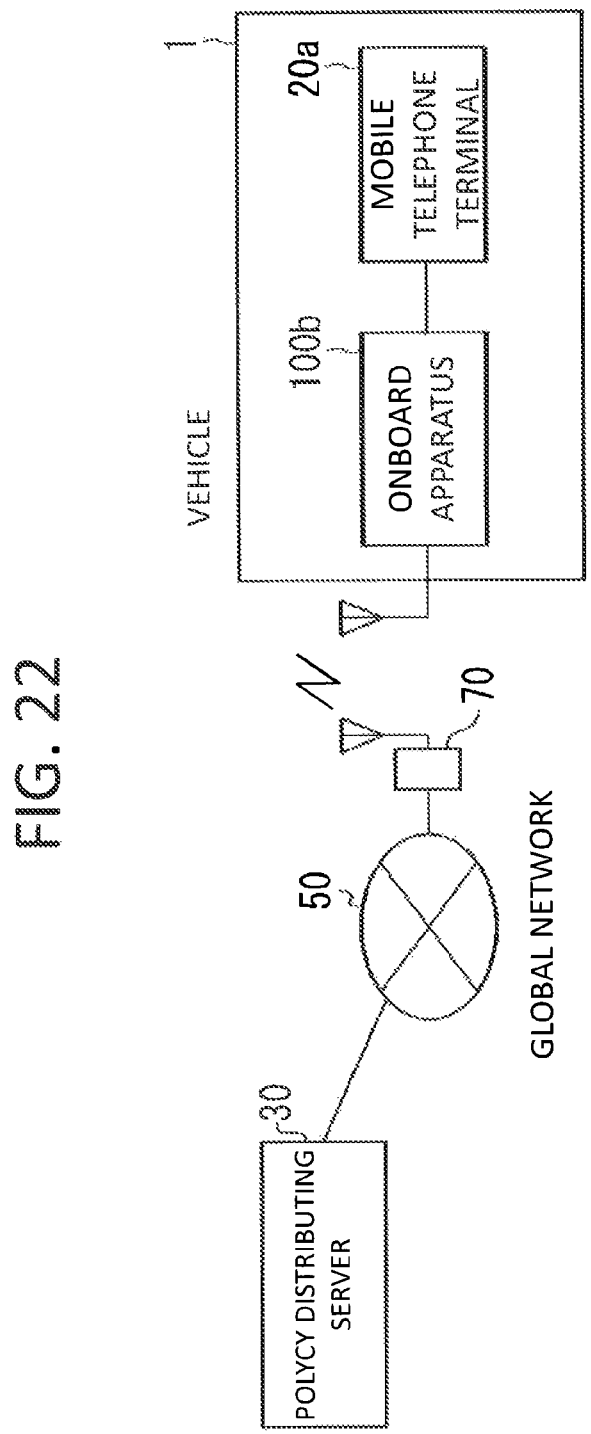
Figure 23:
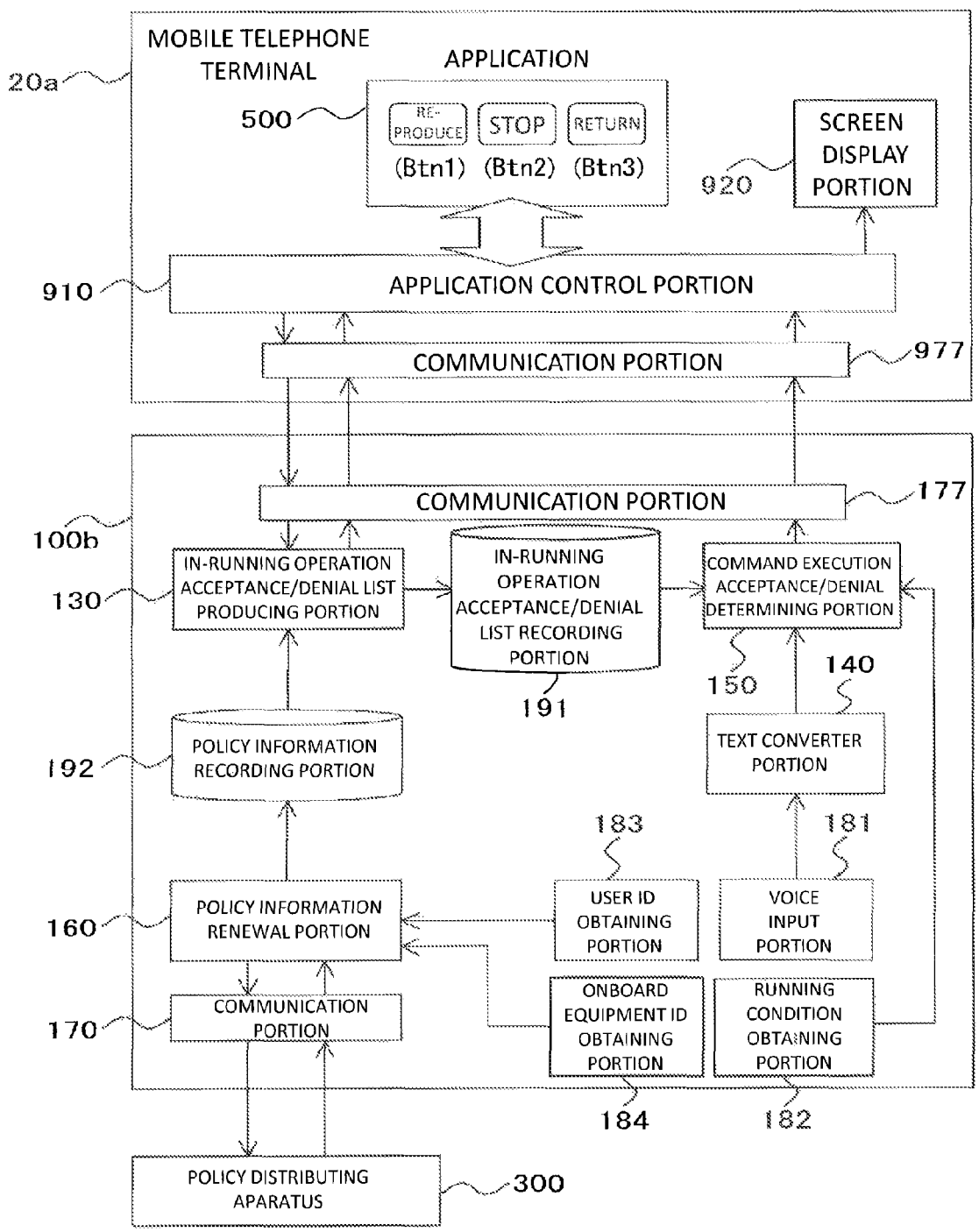

FIG. 7 is a view for showing the format of a command list 210 and an operation acceptance/denial list during running 220, which are used in the onboard apparatus 100;

FIG. 8 is a view for showing an example of the screen when trying to execute viewing/listening of the moving pictures on an application of the voice operating system;

FIG. 9 is a flowchart for showing processes until when a moving picture viewing/listening screen 112b is displayed after pushing down a moving picture viewing/listening button 1212;

FIG. 10 is a flowchart for showing the details of process in a step S110, i.e., a command list producing process;

FIG. 11 is a flowchart for showing the details of a step S130, i.e., the process for producing the operation acceptance/denial list during running 220;

FIG. 12 is a flowchart for showing a flow of processes for executing the operation through voices after pushing down a voice operation starting button 1214 on the moving picture viewing/listening screens 112a and 112b;

FIG. 13 is a flowchart for showing the details of a step S150, i.e., the process for determining acceptance/denial of execution of a command;

FIGS. 14A and 14B are views for showing an example of a popup message when viewing/listening the moving pictures for the voice operation;

FIG. 15 is a flowchart for showing a flow of processes for obtaining a restriction rule 230 from the policy distributing server 300, in a first embodiment of the present invention;

FIG. 16 is a flowchart for showing a flow of processes for obtaining an inhibited word list 230a from the policy distributing server 300;

FIG. 17 is a view for showing an example of the popup message when obtaining the policy information for the voice operation;

FIG. 18 is a total configuration view of the voice operating system, according to a second embodiment of the present invention;

FIG. 19 is a hardware configuration view of a portable (mobile) telephone terminal;

FIG. 20 is a view for showing dataflow and functional configuration of the portable (mobile) telephone terminal and the onboard apparatus, according to the second embodiment of the present invention;

FIG. 21 is a flowchart for showing a flow of processes for obtaining the restriction rule 230 from the policy distributing server 300, in the second embodiment of the present invention;

FIG. 22 is a total configuration view of the voice operating system, according to a third embodiment of the present invention; and FIG. 23 is a view for showing dataflow and functional configuration of the portable (mobile) telephone terminal and the onboard apparatus, according to the third embodiment of the present invention.

DETAILED DESCRIPTION OF THE PREFERRED EMBODIMENTS

Hereinafter, each embodiment according to the present invention will be fully explained by referring to one of FIGS. 1 through 23 attached herewith.

<Embodiment 1>

Hereinafter, explanation will be given on a voice operating system, according to a first embodiment of the present invention, by referring to one of FIGS. 1 to 17.

The voice operating system of the present embodiment is that for restricting an operation, which is undesirable to be executed during the running, when operating an application software (hereinafter, also being called only, "application"), which is operated on a car navigation, through voices. In more details, a command title or name, being corresponded to operation buttons displayed on a screen of the application, is extracted as a title or name of the command, which can be operated through voices, and in addition thereto, a list of words, which means an undesirable operation to be executed during the running, is distributed from a server apparatus, wherein determination is made on each command, if it can be executed or not, by comparing the title of a voice operating command, which is extracted from the application, with a word, which is included in the list received from the server apparatus.

First of all, explanation will be given on the configuration of the voice operating system, according to the first embodiment of the present invention, by referring to one of FIGS. 1 to 5.

Figure 1:
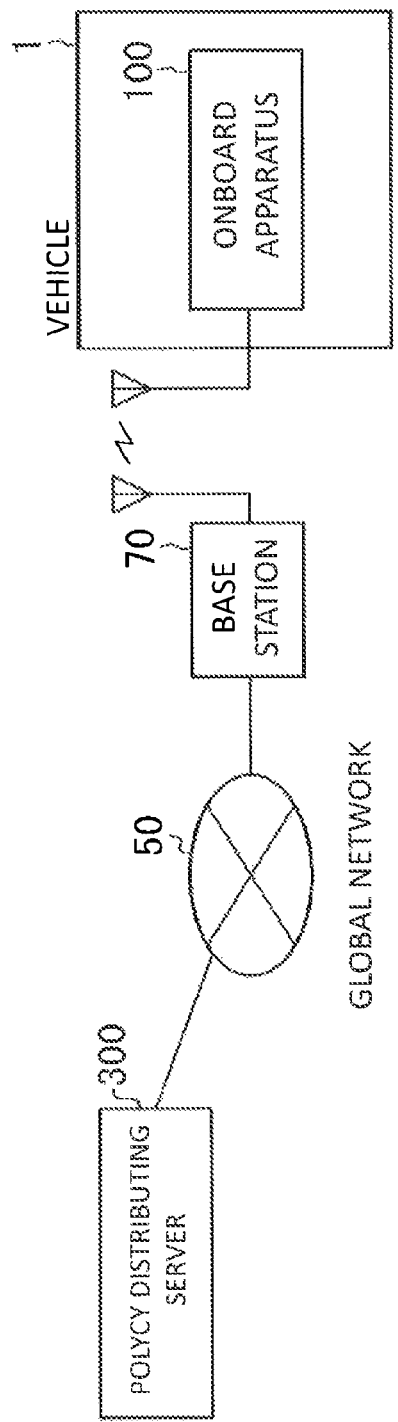
FIG. 1 is a total configuration view of a voice operating system, according to a first embodiment of the present invention.

FIG. 1 is a total configuration view of a voice operating system, according to a first embodiment of the present invention.

Figure 2:
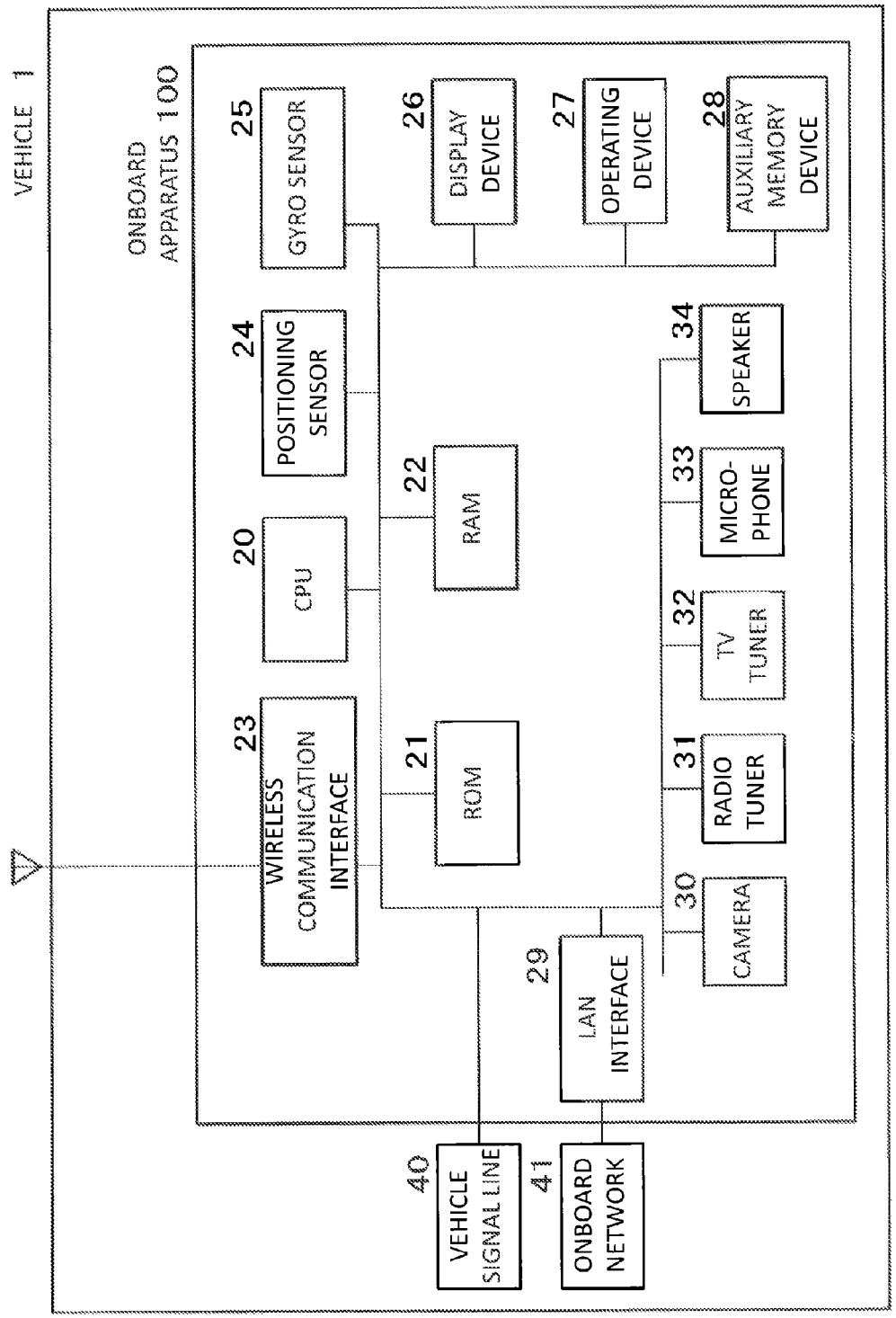
FIG. 2 is a hardware configuration view of an onboard apparatus.

FIG. 2 is a hardware configuration view of an onboard apparatus.

Figure 3:
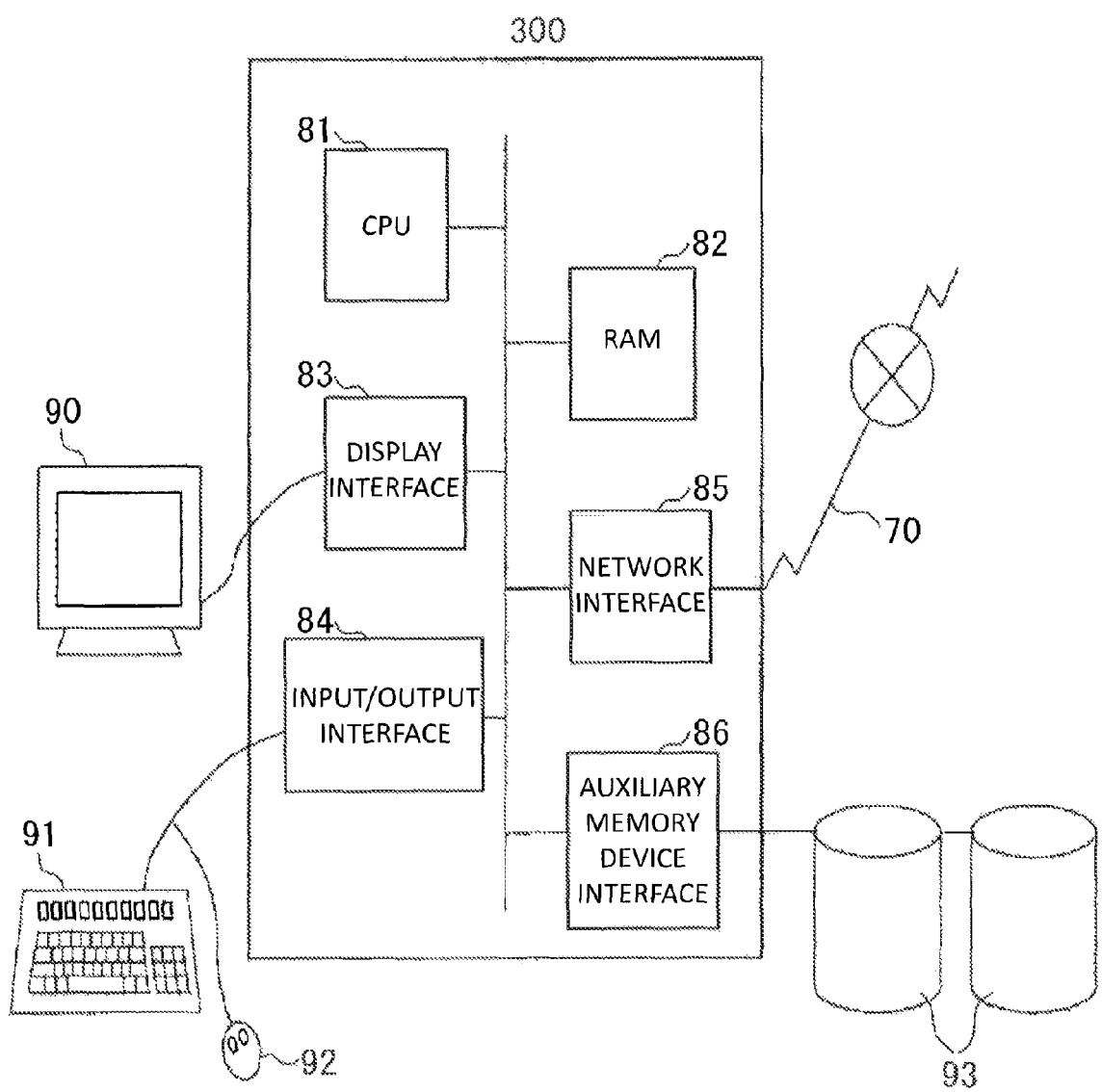
FIG. 3 is a hardware configuration view of a policy distributing server.

FIG. 3 is a hardware configuration view of a policy distributing server.

Figure 4:
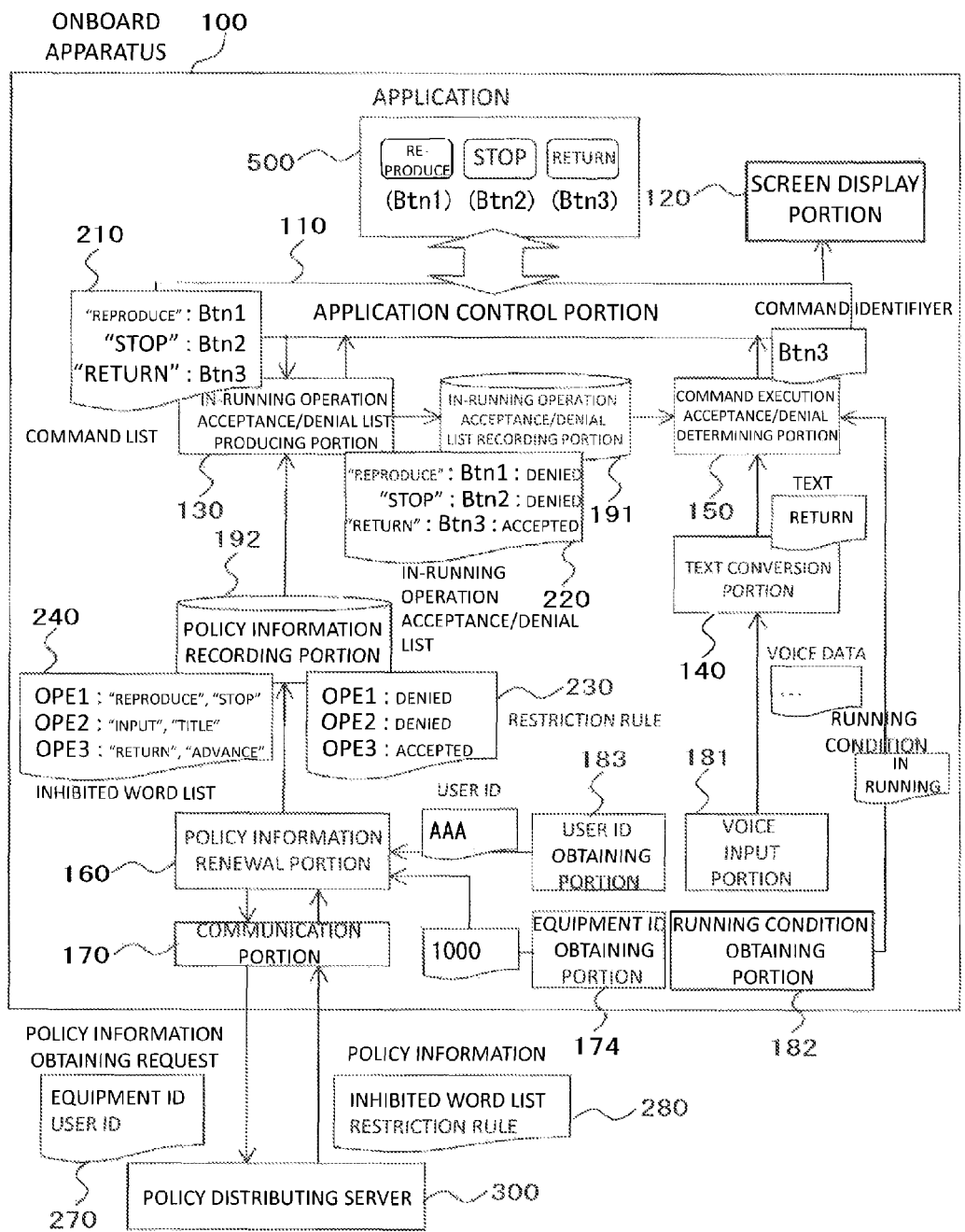
FIG. 4 is a view for showing a dataflow and a function configuration of the onboard apparatus.

FIG. 4 is a view for showing a dataflow and a function configuration of the onboard apparatus.

Figure 5:
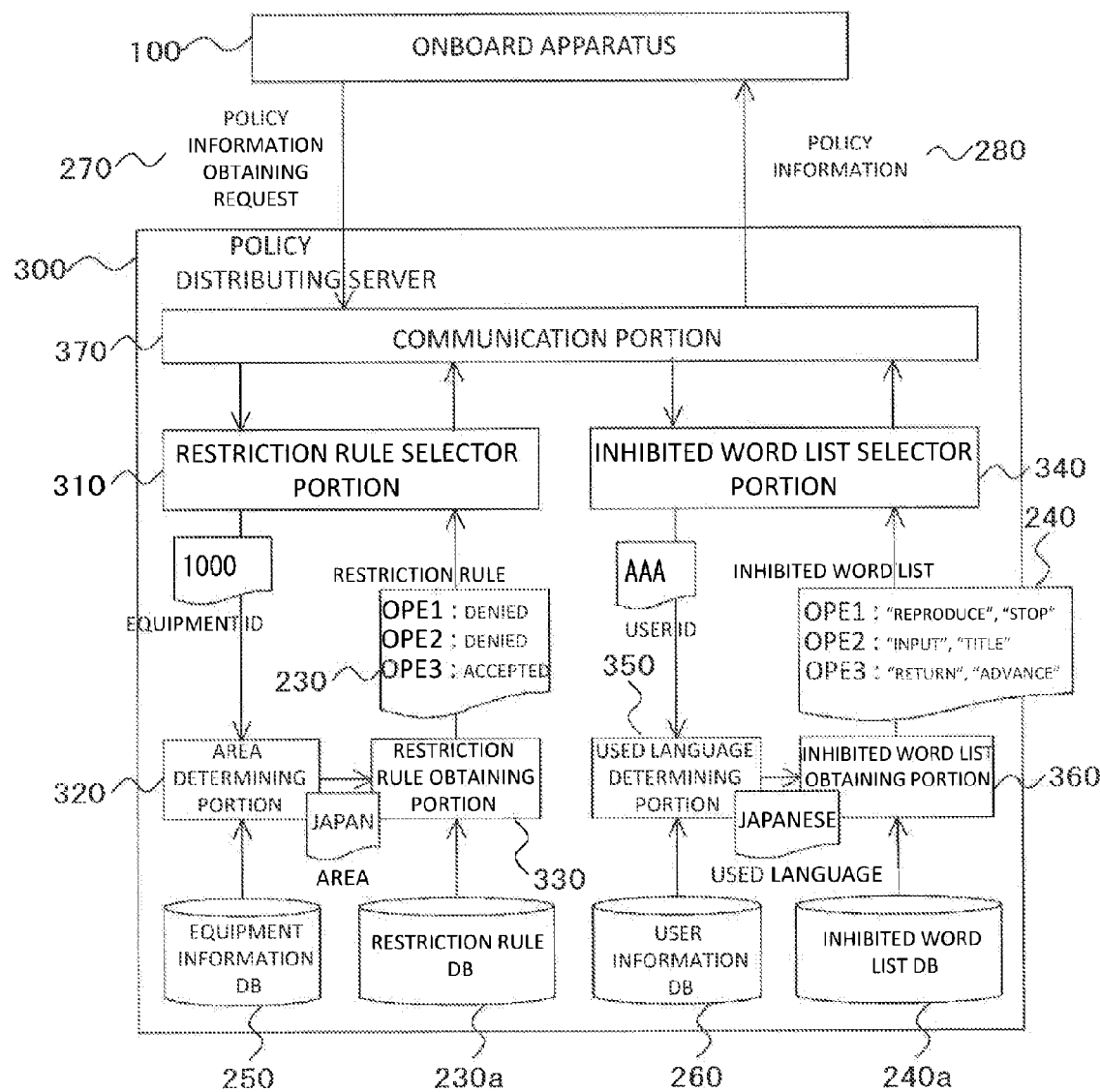
FIG. 5 is a view for showing a dataflow and a function configuration of the policy distributing server.

FIG. 5 is a view for showing a data flow and a function configuration of the policy distributing server.

The voice operating system according to the first embodiment of the present invention, is a system for enabling a user of a vehicle 1 to operate the onboard apparatus 100, which is mounted on the vehicle 1, through voices, and it is constructed with, including the vehicle having the onboard apparatus 100 and a policy distributing server 300, which is connected with a base station 70 through a global network 50.

The onboard apparatus 100, in the present embodiment, communicates with the policy distributing server 300, which is connected with the global network 50, through a radio or wireless communication between the base station 70. The policy distributing server 300 is a server for distributing policy information 280 relating the voice operation, to the onboard apparatus 100.

The onboard apparatus 100 issues a request of requiring obtainment of the policy information, periodically or when the user explicitly instructs that. The base station 70 is radio or wireless facilities for relaying the global network 50, through the wireless communication of the onboard apparatus 100.

And, the base station 70 transmits the request to the policy server 300, which is connected with the global network 50. The policy distributing server 300 transmits the policy information responding to the request to the onboard apparatus 100 as a response.

Herein, the global network 50 means a global communication network, such as, a telephone network or the Internet network, etc.

The onboard apparatus 100 restricts operation of an application 500 through voices, by referring to policy information 280 received.

Next, explanation will be given on the hardware configuration of the onboard apparatus 100, by referring to FIG. 2.

As is shown in FIG. 2, the on board apparatus 100 is constructed with a CPU 20, a ROM 21, a RAM 22, a wireless communication interface 23, a positioning sensor 24, a gyro sensor 25, a display device 26, an operating device 27, an auxiliary memory device 28, a LAN communication interface 29, a camera 30, a radio tuner 31, a television tuner 32, a microphone 33 and a speaker 34, as the hardware thereof.

The CPU (Central Processing Unit 20) is a unit for calculating/controlling, i.e., for controlling each portion of the onboard apparatus 100, and for executing application software of a car navigation, which is loaded on the RAM 22.

The ROM (Read Only Memory) 21 is a memory device for exclusive use of readout, to which control programs and so on are written in.

The RAM (Read Access Memory) 22 is a memory device, for loading a program, which is memorized in the auxiliary memory device 28, to be stored therein, temporarily, or for memorizing work data therein.

The wireless communication interface 23 is an interface to connect with an external apparatus, which is connected with the global network 50, through the base station 70, thereby exchanging data.

The positioning sensor 24 is a sensor for measuring a position of itself, which is indicated by latitude and longitude on the globe.

The gyro sensor 25 is a sensor for measuring an angle and/or an angular velocity of the vehicle.

The display device 26 is a device for displaying video information to the user, such as, a liquid crystal display or an organic EL (Electro-Luminescence), etc.

The operating device 27 is a device for the user to operate the onboard apparatus 100 by a finger, such as, a button, a switch, a keyboard, a touch panel, etc.

The auxiliary memory device 28 is a memory device of large capacity, for memorizing application software of the car navigation therein, in addition to various kinds of data, such as, a map database, the policy information 280, voice data, moving picture data, etc., and is made up with a HDD (Hard Disk Drive) or a SDD (Solid State Drive), for example.

The LAN interface 29 is a device for connecting with an onboard network 41, thereby taking data, indicating a running condition of the vehicle 1 and/or an internal condition, from the onboard network 41, into an inside thereof.

Also, the onboard apparatus 100 is also connected with a vehicle signal line 40, and is able to take the running condition and the internal condition of the vehicle 1 therein.

The camera 30 is an optical apparatus for photographing an external environment of the vehicle 1, to be taken therein.

The radio tuner 31 receives radio wavers, short-waves, middle-waves, ultra short-waves, on an antenna, to be tuned, and thereby for listening it as a program. In particular, when receiving a FM multiplex broadcast, traffic information can be received from VICS (Vehicle Information and Communication System)(®).

The television tuner 32 is an apparatus for receiving the radio waves of the ultra short-waves, to be tuned, and thereby reproducing a moving picture as a TV program.

The microphone 33 is a device for collecting voices of the user.

The speaker 34 is a device for outputting music information, voice guidance when guiding a route, and an operating sound, etc.

Next, explanation will be given on the hardware configuration of the policy distributing server 300, by referring to FIG. 3.

The hardware configuration of the policy distributing server 300, as is shown in FIG. 3, includes a CPU 81, a RAM 82, a display interface 83, an input/output interface 84, a network interface 85, and an auxiliary memory device interface 86, which are connected with each other through a bus.

On a display device 90 is displayed a monitor and/or a result of output of operating condition. With the input/output interface 84 is connected input/output devices, such as, a keyboard 91 and a mouse 92, etc., and a manager inputs a command or the like from those input/output devices. With the network interface 85 is connected the global network 50, then communication is conducted through this interface between the external apparatuses. With the auxiliary memory device interface 86 is connected a memory device, such as, a hard disk drive 93 for storing data and/or programs thereon. There may be a case where the hard disk drive 93 is connected on an array, thereby building up a disc array.

The policy information 280, a database management program for policy distribution, and/or OS are stored on the hard disk drive 93, and they are loaded on the RAM 82 when being executed, and are executed by the CPU 81.

Next, explanation will be given on a dataflow and function configuration of the onboard apparatus 100, by referring to FIG. 4.

The onboard apparatus 100 comprises, as is shown in FIG. 4, an application control portion 110, a screen display portion 120, an in-running operation acceptance/denial list producer portion 130, an in-running operation acceptance/denial list recording portion 191, a voice input portion 181, a text converter portion 140, a running condition obtaining portion 182, a command execution acceptance/denial determining portion 150, a user ID obtaining portion 183, an equipment ID obtaining portion 184, a policy information renewal portion 160, a policy information recording portion 192, and a communication portion 170.

The application control portion 110 is a portion for producing a command list 210 (will be mentioned later) while extracting a command, which can be operated through voices, from the application 500, and for executing the operation through voices for the application 500.

The screen display portion 120 is a portion for displaying an execution screen of the application on the display device 26.

The in-running operation acceptance/denial list producer portion 130 is a portion, for producing an in-running operation acceptance/denial list (will be mentioned later), to be used in determination of acceptance/denial of the operation during the time when the vehicle is running, for each voice operation command.

The in-running operation acceptance/denial list recording portion 191 is a portion, for recording an in-running operation acceptance/denial list produced, therein.

The voice input portion 181 is a portion, for inputting voice data, which the user utters.

The text converter portion 140 is a portion, for converting the voice data inputted into text.

The running condition obtaining portion 182 is a portion, for obtaining the running condition of the vehicle from the vehicle signal line 40 or the onboard network 41.

The command execution acceptance/denial determining portion 150 is a portion, for determining acceptance/denial of execution of the voice operation command, which the text indicates.

The user ID obtaining portion 183 is a portion, for obtaining a user ID, which is identification information of the user who is using the onboard apparatus 100.

The equipment ID obtaining portion 184 is a portion, for obtaining an equipment ID 1000, which is an identifier of the onboard apparatus 100.

The policy information renewal portion 160 is a portion, for obtaining the policy information 280, including a restriction rule 230 (will be mentioned later) and an inhibited word list 240 (will be mentioned later), from the policy distributing server 300, by referring the user ID 183 and the equipment ID 1000.

The policy information recording portion 192 is a portion, for recording therein the policy information obtained.

The communication portion 170 is a portion, for conducting communication between the policy distributing server 300.

Next, explanation will be given on dataflow and function configuration of the policy distributing server 300.

The policy distributing server 300 is constructed with, as is shown in FIG. 5, a restriction rule selector portion 310, an equipment information database 250, an area determining portion 320, a restriction rule database 230a, a restriction rule obtaining portion 330, an inhibited word list selector portion 340, a user information database 260, a used language determining portion 350, an inhibited word list database 240a, an inhibited word list obtaining portion 360 and a communication portion 370.

The restriction rule selector portion 310 is a portion, for selecting the restriction rule 230 depending on the content of a policy information obtaining request 270, which is received from the onboard apparatus 100.

The equipment information database 250 is a database, for storing the information of plural numbers of equipments, including the onboard apparatus 100 therein.

The area determining portion 320 is a portion, for determining an area where the onboard apparatus locates, by referring to the equipment information database 250.

The restriction rule database 230a is a database, for storing therein plural numbers of restriction rules 230, each of which is defined for each area.

The restriction rule obtaining portion 330 is a portion, for obtaining the restriction rule 230 determined, from the restriction rule database 230a.

The inhibited word list selector portion 340 is a portion, for selecting the inhibited word list, depending on the content of the policy information obtaining request 270 received from the onboard apparatus 100.

The user information database 260 is a database, for recording the information of plural numbers of users, including the user who is using the onboard apparatus 100.

The used language determining portion 350 is a portion, for determining the language used by the user who is using the onboard apparatus 100, by referring to the user information database 260.

The inhibited word list database 240a is a database, for storing therein plural numbers of inhibited word lists, each of which is defined for each language.

The inhibited word list obtaining portion 360 is a portion, for obtaining the inhibited word list 240 determined for use of the used language, from the inhibited word list database 240a.

The communication portion 370 is a portion for conducting communication between the onboard apparatus 100.

Next, explanation will be given on the data structure to be applied in a voice recognizing system, according to the present invention, by referring to FIGS. 6 and 7.

FIG. 6 is a view for showing the structure of a database, which is held by the policy distributing server 300.

FIG. 7 is a view for showing the format of a command list 210 and an operation acceptance/denial list during running 220, which are used in the onboard apparatus 100.

The database held by the policy distributing server 300 includes, as is shown in FIG. 6, an equipment information database 250, a user information database 260, a restriction rule database 230a and an inhibited ward list database 240a.

The equipment information database 250 records therein equipment ID 251, for identifying the equipment, uniquely, and an area 252 of the position where the equipment indicated by the equipment ID 251 is used.

The user information database 260 records therein user ID 261, for identifying the user, uniquely, and a used language 262 indicating the language used by the user, which the user ID indicates.

The restriction rule database 230a records plural numbers of restriction rules 230, each of which is defined for each area, and in the figure are described the restriction rules of Japan and EU, and a default rule, to which the reference should be made when the area is not clear.

The restriction rule 230 records therein operation ID 231 for identifying the content of operation, and operation acceptance/denial 232 indicating if that operation indicated by the operation ID can be made or not, during the running. An example shown in the figure, and in case of Japan, it is indicated that the operation, the operation ID of which is "OPE1" or "OPE2", is inhibited from being operated during the running, but the operation, the operation ID of which is "OPE3", can be operated even during the running.

The inhibited ward list database 240a records therein plural numbers of the inhibited word lists 240, which is defined for each language, the figure shows examples of Japanese and English.

The inhibited word lists 240 records therein an operation ID 241 for identifying the content of operation, and an inhibited word 242 describing one or more pieces of words, which the operation ID 241 indicates. In the examples shown in the figure, the operation ID defines "reproduce", "stop", etc., as the words for presenting the operation of "OPE1". Also, the restriction rule 230 and the inhibited word list 240 are combines, applying the operation ID as a key.

As the data to be used in the onboard apparatus 100, there are a command list 210 and also an in-running operation acceptance/denial list 220, as is shown in FIG. 7, wherein the command list 210 is produced by the application controlling part 110 of the onboard apparatus 100, and the in-running operation acceptance/denial list 220 is produced by the in-running operation acceptance/denial list producer portion 130.

The command list 210 stores therein a command title 211, e.g., a line of characters indicating the title of the command, and a command identifier 212 for identifying that command, uniquely, within the application 500.

The in-running operation acceptance/denial list 220 stores therein a flag of operation acceptance/denial 223, indicating if it can be operated or not during the running of the vehicle, in addition to the command title 221, similar to the command list 210, and the command identifier 222.

Next, explanation will be given on an operation image of a user interface of the voice operating system, according to the first embodiment of the present invention, by referring to FIG. 8.

FIG. 8 is a view for showing an example of the screen when trying to execute viewing/listening of moving pictures on an application of the voice operating system.

A menu screen 121 shows a screen after starting of the onboard apparatus 100, which is displayed on the display device 26. The menu screen 121 has a navigation button 1211, a moving picture viewing/listening button 1212, a telephone button 1213 and a voice input starting button 1214, corresponding to the function equipped with the onboard apparatus 100.

Among of those, when pushing down the moving picture viewing/listening button 1212 for starting the application 500, for viewing/listening the moving pictures, a moving picture viewing/listening screen 122a of the application is displayed, if the vehicle 1 is in a stopping condition. The moving picture viewing/listening screen 122a has a contents display region 1221, a contents list display region 1222 for displaying a list of contents reproducible, a reproduce button 1223 for starting reproduction of contents, a stop button 1224 for stopping the reproduction of contents, a return button 1225 for turning back to the menu screen 121, and a voice input start button 1214.

On the other hand, when pushing down the moving picture viewing/listening button 1212 for starting the application 500, for viewing/listening the moving pictures, but if the vehicle 1 is in a running condition, a moving picture viewing/listening screen 122b for the application 500 is displayed. On this moving picture viewing/listening screen 122b, comparing to the moving picture viewing/listening screen 122a, the contents display region 1221 for displaying video contents, the contents list display region 1222 for displaying the list of contents, the reproduce button 1223, and the stop button 1224 are invalidated to be inoperable, e.g., non-input display, for the purpose of protecting the user from being distracted in her/his attention. However, the return button 1225 is not invalidated, since it is still operable during the running of vehicle. And, when the user speaks "return" while pushing down the voice input start button 1214, under the condition where the screen 122 is displayed, then the screen shifts into the menu screen 121 even when the vehicle is in the running condition. But, the user speaks (or generates) the command relating to the moving picture viewing/listening, such as, "reproduce" or "stop", while pushing down the voice input start button 1214, under the condition where the screen 122 is displayed, then that command is nullified since it is inhibited from being operated.

The user never pushes down the button(s) relating to the nullified command(s) through an erroneous operation, since it/they is/are displayed "non-input", and it is also possible to prevent the commands relating to the moving picture viewing/listening, which are inhibited, such as, "reproduce" and "stop", from being spoken by her/him.

Next, explanation will be given on the processes from when the moving picture viewing/listening button is pushed down until when the moving picture viewing/listening screen is displayed, by referring to one of FIGS. 9 to 11.

FIG. 9 is a flowchart for showing processes until when a moving picture viewing/listening screen 112b is displayed after pushing down the moving picture viewing/listening button 1212.

FIG. 10 is a flowchart for showing the details of process in a step S110, i.e., a command list producing process.

FIG. 11 is a flowchart for showing the details of a step S130, i.e., the process for producing the in-running operation acceptance/denial list 220.

When the user pushes down the moving picture viewing/listening button 1212, an instruction of exchanging the screen is transmitted from the screen display portion 120 to the application controller portion 110, and at timing when displaying the moving picture viewing/listening screen 112b, the application controller portion 110 produces the command list 210 (S110).

Next, the in-running operation acceptance/denial list producer portion 130 produces the in-running operation acceptance/denial list 220, by referring to the command list 210 produced and the restriction rule 23 and the inhibited word list 240, which are recorded within the policy information recording portion 192 (S130).

After producing the in-running operation acceptance/denial list 220, while the application controller portion 110 nullifies the button(s) inoperable on the screen 122 of the application 500 (S111), the in-running operation acceptance/denial list producer portion 130 produces the in-running operation acceptance/denial list 220, and the in-running operation acceptance/denial list recording portion 191 records the in-running operation acceptance/denial list 220 produced into the auxiliary memory device 28 (S131).

Explanation will be given on the process in a step 110 of the command list producing process, by referring to FIG. 10.

First of all, a recording area of the command list 210 is initialized into a vacant condition (S1101).

Next, a number of object(s) (e.g., the button(s), etc.) included in the screen displayed at present (i.e., the moving picture viewing/listening screen 122b) is set to a variable "N" (S1102).

Next, it is determined if "N" is "0" (zero) or not (S1103).

In case where "N" is not "0" (zero), determination is made on whether the "Nth" object is a button or not (S1104).

In case where the "Nth" object is the button, a display title and ID information of the button are obtained, and are added to the command title 211 and the command identifier 212 of the command list 210, respectively (S1105). For example, it is assumed that the display title as the object is "reproduce", of the reproduce button 1223 shown in FIG. 8. In this instance, this is set to the command title 211 of the command list 210, as "reproduce". Also, with reproducing equipment of a player, in general, a right-oriented triangle (e.g., "▷") is used, as a mark for indicating "reproduce", however if defining "right-oriented triangle", as the display title of that button, and "reproduce" for presenting the function, as an alternative title thereof, then the alternative title "reproduce" is taken, and that is set to the command title 211 of the command list 210, as "reproduce".

With this, since a developer can use the display title as the command title, as it is, after bringing the display title and the function of the command to be coincident with, then this results to reduce the labor of developing.

Next, a value obtained by subtracting "1" from "N" is set to "N" (S1106), and the process turns back to S1103.

And after repeating the steps from S1103 to S1106, at the time when "N" comes down to "0", the command list 210 is informed to the in-running operation acceptance/denial list producer portion 130, thereby completing the process (S1107). However, obtaining the number of the objet(s) in the S1102 mentioned above, and obtaining the "Nth" object in the S1104, etc., are the functions equipped with, in general, by a software library for producing GUI (Graphical User Interface) screen, and for example, in case of the application operable on "Android", i.e., OS for Smartphone, they can be obtained by applying "getChildCount( ) method" or "getChildAt( ) method", etc., which are provided through Java(®) language.

Next, explanation will be given on the details of the step S130, e.g., the process for producing the in-running operation acceptance/denial list 220, by referring to FIG. 11.

First of all, a line number of the command list 210 produced is set to the variable "N" (S1301).

Next, it is determined if "N" is "0" (zero) or not (S102).

Next, if "N" is not "0", then search is made on the inhibited word list 240, which is recorded in the policy information recording portion 192 (S1303), and checking on whether the "Nth" command title 211 of the command list 210 is included or not, within the inhibited words 242 of the inhibited word list 240 (S1304).

If there is included the word, coincident with the "Nth" command title 211, within the inhibited words 242 of the inhibited word list 240, operation acceptance/denial 232 is obtained, of the operation indicated by the operation ID during the running of the vehicle, by referring to that operation ID 241 including the word coincident with, and the restriction rule 23 recorded in the policy information recording portion 192 (S1305).

Next, determination is made of whether the operation acceptance/denial 232 is "acceptance" or "denial" (S1306), and if it is "denial", the operation acceptance/denial 223 of the in-running operation acceptance/denial list 220 is set to "denial" (S1307).

If there can be found no line including the command title 211 within the inhibited word list 240 in the step S1304 mentioned above, or if the operation acceptance/denial 232, which is obtained in the step S1306 mentioned above, is "acceptance", the operation acceptance/denial 223 of the in-running operation acceptance/denial list 220 is set to "acceptance" (S1308).

Next, the value obtained by subtracting "1" from "N" is set to "N" (S1309), and the process is tuned back to S1302.

And, after repeating the steps from S1302 to S1309, repetitively, the process is completed at the time when "N" comes down to "0".

Next, explanation will be given on the process of the onboard apparatus 100 when executing the command responding to the voices, which are spoken by the user, by referring to one of FIGS. 12 to 14B. FIG. 12 is a flowchart for showing a flow of processes for executing the operation through voices after pushing down the voice operation starting button 1214 on the moving picture viewing/listening screens 112a and 112b. FIG. 13 is a flowchart for showing the details of a step S150, i.e., the process for determining acceptance/denial of execution of a command. FIGS. 14A and 14B are views for showing an example of a popup message when viewing/listening the moving pictures for the voice operation.

When the voice operation starting button 1214 is pushed down, an instruction of starting the voice operation is transmitted from the screen display portion 120 to the voice input portion 181. Upon receipt of this, the voice input portion 181 inputs the voices, which the user speaks, with using the microphone 33.

Next, the text converter portion 140 converts the voice data into text (S140). However, the process for converting the voice data inputted through the microphone into the text is already known, and is put into a practical use thereof, as a technology, being collectively called, "Speech-to-Text", in general.

Next, determination is made if the voice data can be converted into the text or not (S141). If it can be converted into any kind of text, the command execution acceptance/denial determining portion 150 determined the acceptance/denial of executing the voice operation command responding to the text converted, by referring to the text converted and the in-running operation acceptance/denial list 220 (S150).

Next, determination is made if the acceptance/denial of execution determined is "acceptance" or not (S151), and if the voice operation command can be executed responding to the text converted, the command identifier 222, which is described in the in-running operation acceptance/denial list 220, is transmitted to the application controller portion 110, and the application controller portion 110 executes the process of pushing down of the button corresponding to the command identifier 222 (S111).

In case where the conversion cannot be made from the voice data into the text in the step S141 mentioned above, or where the execution of the command corresponding to the text converted is determined "denial" in S151, the screen display portion 120 displays an error screen on the display device 26 (S121).

Next, explanation will be given on the details of the step S150, i.e., a process for determining command execution acceptance/denial, by referring to FIG. 13.

The command execution acceptance/denial determining portion 150, first of all, searches the in-running operation acceptance/denial list 220 (S1501), and also searches if there is a line, in which the text converted from the voice data is coincident with the command title 221 of the in-running operation acceptance/denial list 220 (S1502). However, this determination of coincidence may be made under the condition that both the character lines are restrictively coincident with, or may be made under the condition that one of the character line is included in the other character line, or may be applied a mechanism therein, for determining likeliness or similarity between two (2) character lines through a conventional method, such as, "N-gram", etc. Further, the "N-gram" is a method for determining the likeliness of the character lines, which is applied in a search engine, etc., and is for determining the degree of the likeliness by counting a number of coincidences of continuous "N" pieces of characters.

In case where it is determined that there is a line, in which the text converted the command title 221 are coincident with, through such the method as mentioned above, a running condition is obtained by means of the running condition obtaining portion 182 (S1503), and it is determined if the vehicle is under the condition of running or not, by referring to the running condition obtained (S1504). However, if the vehicle is in running or not is determined, by obtaining a vehicle signal, such as, a vehicle speed pulse or the like from the vehicle signal line 40 of the system of the vehicle, in general, in the conventional car navigation, then the determination is made with applying the similar method, in the voice recognizing system according to the present embodiment.

And, if it is determined that the vehicle is in running, determination is made if it can be operated or not, during the time when the vehicle is running, by referring the operation acceptance/denial 223 in the line, which is searched out in the step S1502 (S1505).

If the operation is possible, the command identifier 222 of that line is notified to the application controller portion 110 (S1506). However, in the similar manner to that, when it is determined that the vehicle is not in running in S1504 mentioned above, the command identifier 222 is notified to the application controller portion 110, and the process is completed.

In case where there is no line, in which the text converted and the command title 221 of the in-running operation acceptance/denial list 220 are coincident with, then it is determined there is no command executable, and the process is ended (S1507). Also, when it is determined that in-running operation cannot be made in S1505 mentioned above, and then determination is made on whether the application 500 is authenticated or not, as a special application, being allowed to be operated during the running of the vehicle (S1509), and if it is the authenticated application, S1506 is executed irrespective of the content of the in-running operation acceptance/denial list. However, with the means for identifying it is the authenticated application or not, this can be achieved by a means, for example, giving a digital signature, upon basis of a public key encoding technology, to the application, etc. If the application 500 is not such a special one authenticated, the process is ended, while determining that there is a command corresponding to the content, which the user speaks, but cannot be executed during the time when the vehicle is running (S1508).

In this manner, in case of the authenticated application, operations relating to the applications for dealing with the car navigation, for example, can be always executed, irrespective of the running condition of the vehicle, always.

Next, explanation will be given on a user interface relating to the voice operations, by referring to FIGS. 14A and 14B.

A popup message 1231 shown in FIG. 14A is an example of messages when notifying the user that there is no executable command, after executing the step S1507.

Also, a popup message 1232 shown in FIG. 14B is an example of messages when notifying the user that there is an executable command corresponding to the content, which the user speaks, but cannot be executed during the time when the vehicle is running, after executing the step S1508.

Any one of those popup messages is automatically closed, after being displayed for a predetermine time-period, such as, about 10 seconds, for example, for reducing the load of operation of the user.

Next, explanation will be given on a process for obtaining the restriction rule and the inhibited word list, which are referred, from the policy distributing server, by referring to FIGS. 15 and 16.

FIG. 15 is a flowchart for showing a flow of processes for obtaining a restriction rule 230 from the policy distributing server 300, in a first embodiment of the present invention.

FIG. 16 is a flowchart for showing a flow of processes for obtaining an inhibited word list 230a from the policy distributing server 300.

When the onboard apparatus 100 is started, as is shown in FIG. 15, the policy information renewal portion 160 obtains the equipment ID from the equipment ID obtaining portion 184 (S1601). And, the equipment ID obtained, being included in the policy information obtaining request 270, is transmitted to the area determining portion 320, passing through the restriction rule selector portion 310 of the policy distributing server 300. The area determining portion 320 determines if there is a line, in which the equipment ID received and the equipment ID 251 of the equipment information database 250 are coincident with, by referring to the equipment information database 250 (S3201).

If there is the line, in which they are coincident with, an area where the onboard apparatus 100 is positioned is obtained by referring to the area 252, which is described in that line (S3202).

Next, the restriction rule obtaining portion 330 determines if there is the restriction rule 230 for use of the area or not, on which the determination is made, by referring to the restriction rule database 230a (S3301).

If there is the restriction rule 230, that restriction rule 230 is obtained from the restriction rule database 230a (S3302), and is noticed to the restriction rule selector portion 310.

On the other hand, if there cannot be found the line coincident with the equipment ID received in the step S3201, or if there is no restriction rule for use of the area determined, in the step S3301, the restriction rule selector portion 310 selects a default rule (S3101).

The restriction rule selector portion 310 responds the restriction rule 230, which is obtained in the step S3302 or the step S3101, to the policy information renewal portion 160 (S3102).

The policy information renewal portion 160 records the restriction rule 230 received in the policy information recording portion 192, thereby completing the process (S1602). However, in the processes mentioned above, when an error occurs in a series of processes for obtaining the restriction rule, the default rule is selected; but, a popup message may be displayed, for prompting the user to step the operation of the onboard apparatus 100, when the error is generated.

When the onboard apparatus 100 is started, as is shown in FIG. 16, the policy information renewal portion 160 obtains the user ID from the user ID obtaining portion 183 (S1605).

The user ID obtained, being included in the policy information obtaining request 270, is transmitted to the used language determining portion 350, passing through the inhibited word list selector portion 340 of the policy distributing server 300.

The used language determining portion 350 determines if there is a line, in which the user ID received and the user ID 261 of the user information database 260 are coincident with, by referring to the user information database 260 (S3501).

If there is the line, in which they are coincident with, the language used the user is determined, which is indicated by the user ID received, by referring to the used language 262, which is described in that line (S3502).

Next, the inhibited word list obtaining portion 360 determines if there is the inhibited word list 240 or not, which is described by the used language determined, by referring to the inhibited word list database 240a (S3601).

If there is the inhibited word list 240, that inhibited word list 240 is obtained from the inhibited word list database 240a (S3602), and is noticed to the inhibited word list selector portion 340.

The inhibited word list selector portion 340 responds the inhibited word list 240 obtained to the policy information renewal portion 160 (S3402).

The policy information renewal portion 160 records the inhibited word list 240 received into the policy information recording portion 192, thereby completing the process (S1607).

On the other hand, if the language used by the user cannot be determined corresponding to the user ID received, in the step S3501, or if there is no inhibited ward list for use of the used language determined, in the step S3601, the inhibited word list selector portion 340 responds an error of obtaining the inhibited word list to the policy information renewal portion 160 (S3401).

The policy information renewal portion 160, receiving the error of obtaining the inhibited word list, displays an error message on the screen display portion 120 (S1606).

Next, explanation will be given on the user interface when obtaining the policy information for the voice operation, by referring to FIG. 17.

FIG. 17 is a view for showing an example of the popup message when obtaining the policy information for the voice operation.

In a step S3401, if there is necessity of informing the user of a failure in obtaining the inhibited word list, such a popup message as is shown in FIG. 17 is displayed.

However, in the explanation given in the above, the information of the area where the onboard apparatus 100 exists in advance, for selecting the restriction rule 230; however, there may be applied a mechanism for obtaining the coordinates of a present location of the onboard apparatus 100, with applying a GPS (Global Positioning System, and thereby determining the area with referring it to map data. Also, in this example, the used language of the user is recorded in the database, in advance, for the purpose of selecting the inhibited word list 240; however there may be applied a mechanism of referring to the information of the used language that the user set in the onboard apparatus 100, etc.

As was mentioned in the above, with the voice operating system of the present embodiment, it is possible to restrict the operation, which is not desirable during the time when the vehicle is running, when the application operable on the onboard apparatus 100 is operated through the voices. Also, with applying the mechanism of distributing the policy information for achieving such restriction from the policy information distributing apparatus, it is possible to revise a guideline for each country or to deal with addition of word(s) meaning the operation(s) to be restricted, etc., flexibly.

<Embodiment 2>

Hereinafter, explanation will be given on the voice operating system, according to a second embodiment of the present invention, by referring one of FIGS. 18 to 21.

The voice operating system according to the present embodiment restricts executing of the operation not preferable to be executed during the time the vehicle is running, similar to the first embodiment, when operating the application through the voices, being executable on a portable or mobile telephone terminal, such as, the Smartphone, etc., which is rapidly spread in recent years.

First of all, explanation will be given on the configuration of the voice operating system according to the second embodiment of the present invention, by referring to one of FIGS. 18 to 20.

FIG. 18 is a total configuration view of the voice operating system, according to the second embodiment of the present invention.

FIG. 19 is a hardware configuration view of the portable (mobile) telephone terminal.

FIG. 20 is a view for showing dataflow and functional configuration of the portable (mobile) telephone terminal and the onboard apparatus, according to the second embodiment of the present invention.

As is shown in FIG. 18, in the voice operating system according to the present embodiment, the mobile telephone terminal 20 is connected with the onboard apparatus 100a within the vehicle 30, and the mobile telephone terminal 20 communicates between the policy distributing server 300 of the global network 50 through the wireless communication between the base station 70.

Other constituent elements other than those shown in FIG. 18 are similar to those shown in FIG. 1.

Herein, the mobile telephone terminal 20 is a mobile telephone terminal, such as, the Smartphone, etc., which can be carried about by the user, and the onboard apparatus 100a is a car navigation apparatus.

Next, explanation will be given on the hardware configuration of the mobile telephone terminal 20 according to the second embodiment of the present invention, by referring to FIG. 19.

As is shown in FIG. 19, the mobile telephone terminal 20 is constructed with an APU (Application Processor Unit) 80, a baseband processor 81, a RAM 82, a flash memory 83, a wireless communication interface 84, a positioning sensor 85, an acceleration sensor 86, a gyro sensor 87, a display device 88, an operating device 89, an inter-equipment communication interface 90, a camera 91, a microphone 92 and a speaker 93.

The APU 80 is a unit for controlling each portion of the mobile telephone terminal 20, and for calculation/control, i.e., for executing programs of application software for the voice operation to be loaded on the RAM 81.

The baseband processor 81 is a processor for controlling a module relating to communication and/or conversation of the mobile telephone terminal 20.

The RAM (Read Access Memory) 82 is a memory device for storing the program memorized in the flash memory 83, temporality, after loading it, or for memorizing work data therein.

The flash memory 82 is a non-volatile memory for storing programs and/or data therein. The flash memory 82 is a memory device having a relatively large capacity, for memorizing therein various kinds of data, such as, a map DB, a policy information DB 280, voice data, moving picture data, etc., and also programs, such as, the application software for the voice operation, etc.

The wireless communication interface 84 is an interface apparatus for converting a signal of the baseband processor 81 into a high-frequency signal of a radio band, and on the contrary for converting the high-frequency signal of the radio band into the signal of the baseband processor 81. The mobile telephone terminal 20 communicates between the base station 70 through the wireless communication interface 84, and this enable reading of a Web page through browser. As the radio band is normally used a UHF (Ultra High Frequency).

The positioning sensor 85 is a sensor for measuring the position of itself, which is indicted by the latitude and the longitude on the globe.

The acceleration sensor 86 is a sensor for measuring an acceleration of the mobile telephone terminal 20. With this, also the acceleration of the vehicle 30, on which the mobile telephone terminal 20 is mounted, can be measured, indirectly.

The gyro sensor 87 is a sensor for measuring an angle and/or an angular velocity of the mobile telephone terminal 20. With this, also the angle and/or the angular velocity of the vehicle 30 can be measured, indirectly.

The display device 88 is a device made of a liquid crystal display or an organic EL (Electro-Luminescence) display, etc., for displaying video information to the user, and may be applied one having a display size from 3 inches to 5 inches, normally.

The operating device 89 is devices for the user to operate the mobile telephone terminal 20 by her/his finger, such as, a button, a switch, a keyboard, a touch panel, etc.

The inter-equipment communication interface 90 is an interface apparatus for connecting with other apparatuses, such as, the onboard apparatus 100a, to communicate data between it/them. As a connecting method may be a wired connection, in accordance with a rule of USB (Universal Serial Bus) or HDMI (High-Definition Multimedia Interface), etc., or may be a wireless connection, in accordance with IEEE 802.11a/b/g/n of wireless LAN (Local Area Network) or Bluetooth(®), etc.

The camera 91 an optical apparatus for taking pictures therein through photographing the environment of the mobile telephone terminal 20.

The microphone 92 is a device for collecting speeches of the user or voices/sounds of surrounding the mobile telephone terminal 20.

The speaker 93 is a device for transmitting information to the user through voices/sounds. However, though not shown in the figure, also an earphone or a headphone or the like may be applied as a voice/sound outputting device.

Next, explanation will be given on the dataflow and the function configuration of the mobile telephone terminal 20 and the onboard apparatus 100a, by referring to FIG. 20.

The onboard apparatus 100a comprises, as is shown in FIG. 20, an equipment ID obtaining portion 884, a running condition obtaining portion 882, a video receiver portion 885, a screen display portion 820 and a communication portion 875.

The mobile telephone terminal 20 is constructed with, as is shown in FIG. 20, an application controller portion 110, a video transmitter portion 185, an in-running operation acceptance/denial list producer portion 130, an in-running operation acceptance/denial list recording portion 191, a voice input portion 181, a text converter portion 140, a command execution acceptance/denial determining portion 150, a user ID obtaining portion 183, a policy information renewal portion 160, a policy information recording portion 192, and a communication portion 170.

Herein, in comparison with the configuration of the onboard apparatus 100 of the first embodiment, while removing therefrom the equipment ID obtaining portion 184, the running condition obtaining portion 182 and the screen display portion 120, which are equipped with on the first embodiment, however, the followings are added thereto; a video transmitter portion 185, a running condition memory portion 186 and a communication portion 175 for conducting communication between the onboard apparatus 100a.

The video transmitter portion 185, which is added into the mobile telephone terminal 20, is added in the place of the screen display portion 120, which is equipped with on the information processing apparatus 100 of the embodiment 1, and it is provided for transmitting the screen of the application, which is displayed on the display device 26 through the screen display portion 120, as the video data, in the onboard apparatus 100 of the first embodiment. The video receiver portion 885 of the onboard apparatus 100a is provided for receiving this video data, and the video data received is displayed on the display device 88 through the screen display portion 820. Those video transmitter portion 185 and the video receiver portion 885 are for displaying output video of the mobile telephone terminal 20 (i.e., the Smartphone) on the screen of the onboard apparatus 100a (i.e., the car navigation apparatus), with applying a technology, for example, displaying an output video of a video camera on the screen of a television by connecting the video camera and the television though a HDMI cable, etc.

The running condition memory portion 186 of the mobile telephone terminal 20 of the present embodiment is provided for memorizing the running condition, which is periodically received from the onboard apparatus 100a.

The equipment ID obtaining portion 884, being equipped with on the onboard apparatus 100a of the present embodiment, has a function similar to that of the equipment ID obtaining portion 184, which is equipped with on the onboard apparatus 100 of the first embodiment, and is provided for notifying the equipment ID, i.e., the information for identifying the onboard apparatus 100a, to the policy information renewal portion 160, through the communication portion 875 and the communication portion 175.

The running condition obtaining portion 882, being equipped by the onboard apparatus of the present embodiment, is provided for obtaining the running condition of the vehicle, similar to that of the running condition obtaining portion 182, which is equipped with on the onboard apparatus 100 of the first embodiment, and is for notifying it to the running condition memory portion 186 of the mobile telephone terminal 20, through the communication portion 875 and the communication portion 175.

An operation image of the application 500 is similar to that of the application 500 in the first embodiment, which is shown in FIG. 8. Also with the processes, for producing the in-running operation acceptance/denial list 220, which are executed in the information processing apparatus 100, when the screen 122 of the application 500 is displayed through pushdown of the moving picture viewing/listening button 1212 on the menu screen 121 by the user, they are similar to those of the flow of the processes of the onboard apparatus 100 in the first embodiment, which are shown in one of FIGS. 9 to 11.

Also, with the flow of processes for executing the operation through the voices, though pushdown of the voice operation starting button 1214 on the screen 122 by the user, they are basically similar to the flow of the processes of the onboard apparatus 100 in the first embodiment, which are shown in one of FIGS. 12 to 14B. However, in the present embodiment, obtaining of the running condition in S1503 show in FIG. 13 is conducted by referring to the running condition, which is memorized in the running condition memory portion 186 of the mobile telephone terminal 20.

Next, explanation will be given on processes for obtaining the restriction rule and the inhibited word list referred to from the policy distributing server, by referring to FIG. 21.

FIG. 21 is a flowchart for showing a flow of processes for obtaining the restriction rule 230 from the policy distributing server 300, in the second embodiment of the present invention.

Although the basic flow is similar to the flow of processes shown in FIG. 15, according to the first embodiment, but the step S1601 for obtaining the equipment ID in FIG. 15 is removed therefrom, and the obtaining of the equipment ID is achieved by transmitting the equipment ID obtaining request to the equipment ID obtaining portion 884 of the onboard apparatus 100a, so as to receive the equipment ID of the onboard apparatus 100a from the equipment ID obtaining portion 884. Processes thereafter are similar to those of the flow of processes shown in FIG. 15.

As was shown in the present embodiment in the above, it is possible to restrict the operation, which is undesired to be executed during the time when the vehicle is running, when the application of the mobile telephone terminal, such as, the Smartphone, etc., is operated through the voices, even in a mode of using the mobile telephone terminal, such as, the Smartphone, etc., while displaying an execution screen of the application, which is operated on the mobile telephone terminal, such as, the Smartphone, etc., on the screen of the car navigation apparatus.

<Embodiment 3>

Hereinafter, explanation will be given on the voice operating system according to a third embodiment of the present invention, by referring to FIGS. 22 and 23.

FIG. 22 is a total configuration view of the voice operating system, according to the third embodiment of the present invention.

FIG. 23 is a view for showing dataflow and functional configuration of the portable (mobile) telephone terminal and the onboard apparatus, according to the third embodiment of the present invention.

Also in the voice operating system of the present embodiment, similar to that of the second embodiment, the execution of operation, being undesirable to be executed during the time when the vehicle is running, is restricted, when the application is operated through the voices, which can be executed on the mobile telephone terminal, such as, the Smartphone, etc., widely spreading, rapidly, in recent years. However, the second embodiment is in a mode of being applied while displaying an output video of the mobile telephone terminal, such as, the Smartphone, etc., on the screen of the car navigation apparatus, but comparing to the above, in the present embodiment, there is assumed a mode, i.e., using the mobile telephone terminal, such as, the Smartphone, etc., while setting it on a driver's seat with using a cradle.

Also the entire configuration view of the voice operating system according to the present embodiment, as is shown in FIG. 22, is similar to that of the second embodiment, i.e., the mobile telephone terminal 20a and the onboard apparatus 100b are connected with, in the structures thereof; however, differing from in an aspect in that, not the mobile telephone terminal, but rater the onboard apparatus 100b communicates between the policy distributing server through the base station 70.

Hereinafter, explanation will be given on the dataflow and the function configuration of the mobile telephone terminal according to the present embodiment, mainly about the difference from the first embodiment.

In the entire configuration of the present embodiment, a mobile telephone terminal 20a is added therein, comparing to the entire configuration of the first embodiment shown in FIG. 4. The mobile telephone terminal 20a comprises an application controller portion 910, a screen display portion 920 and a communication portion 977 for conducting communication between the onboard apparatus 100b.

On the other hand, the onboard apparatus 100b does not include the application controller portion 110 and the screen display portion 120, comparing to that of the first embodiment, but a communication portion 177 is added thereto, for communicating between the mobile telephone terminal 20a.

The application controller portion 910 and the screen display portion 920, equipped with on the mobile telephone terminal 20a, correspond to the application controller portion 110 and the screen display portion 120 in the onboard apparatus 100 of the first embodiment, respectively. Thus, the difference from the first embodiment lies in that an apparatus equipped with the application controller portion 110 and the screen display portion 120 is separated from, as a function of the mobile telephone terminal 20a. In addition to such separation, they are constructed so that the communication process to be conducted between the onboard apparatus 100b and the mobile telephone terminal 20a is conducted through the communication portion 177 and the communication portion 977, i.e., including the process for transmitting the command list 210 from the application controller portion 910 to the in-running operation acceptance/denial list producer portion 130, the process for transmitting the in-running operation acceptance/denial list 220 from the in-running operation acceptance/denial list producer portion 130 to the application controller portion 910, and the process for transmitting the command identifier from the command execution acceptance/denial determining portion 150 to the application controller portion 110.

As was shown in the present embodiment, it is possible to restrict the operation, which is undesired to be executed during the time when the vehicle is running, when the application is operated through the voices, even in a mode of using the mobile telephone terminal, such as, the Smartphone, etc., while setting it on the driver's seat with using the cradle.

What is claimed is:

1. An information processing apparatus, to be mounted on a vehicle, for conducting an operation of application software during time when said vehicle is running, comprising:
    an application controller portion, which is configured to execute said application software;
    a running condition obtaining portion, which is configured to obtain a running condition of said vehicle;
    a policy information recording portion, which is configured to record policy information, being restriction rules to be applied to commands for operating said application of software, each of which is defined for each of places where said information processing apparatus is used; and
    an in-running operation acceptance/denial list producing portion, which is configured to produce an in-running operation acceptance/denial list indicative of whether a command for said application software can be operated or not, during the time when said vehicle is running, by referring to said policy information and a command list, which is a list of a display title or an alternate title of the command of said application software, which is displayed after changing a screen, when the screen is switched over by an instruction for changing screen.

2. The information processing apparatus, as is described in the claim 1, further comprising:
    a voice input portion, which is configured to input voice data, where a user speaks;
    a text converting portion, which is configured to analyze said voice data, so as to convert into text data; and
    a command execution acceptance/denial determining portion, which is configured to determine if the command spoken by said user can be operated or not, during the time when said vehicle is running, which is recorded as said text data, by referring to said text data and said in-running operation acceptance/denial list.

3. The information processing apparatus, as is described in the claim 2, wherein said command execution acceptance/denial determining portion determines a degree of likeliness between a title of the command, which is included in said in-running operation acceptance/denial list, and the text data, which is converted from said voice data.

4. The information processing apparatus, as is described in the claim 1, further comprising an application controlling part for nullifying a button corresponding to the command, which cannot be operated, by using the in-running operation acceptance/denial list, which is produced in said in-running operation acceptance denial list producing portion.

5. The information processing apparatus, as is described in the claim 4, wherein the list of the command to be operated from said application software is produced, by extracting a title of a button for use of operation, which is displayed on a screen of said application software.

6. The information processing apparatus, as is described in the claim 1, further comprising:
    a user information obtaining portion, which is configured to obtain user information relating to a language used by said user; and
    an equipment information obtaining portion, which is configured to obtain equipment information relating to an area where said information processing apparatus is used.

7. The information processing apparatus, as is described in the claim 1, further comprising:
    an application authenticating portion, which is configured to authenticate said application software, wherein said command execution acceptance/denial determining protion does not bring the application software, which is authenticated in said application authenticating porting, to be un-executable.

8. The information processing apparatus, as is described in the claim 1, wherein said information processing apparatus is a car navigation system.

9. The information processing apparatus, as is described in the claim 1, wherein said information processing apparatus is a portable telephone terminal.

10. An operating method for an information processing apparatus, to be mounted on a vehicle, for executing an application software and for conducting an operation of application software during time when said vehicle is running, comprising the following steps of:
an application controlling step, for executing said application software;
a running condition obtaining step, for obtaining a running condition of said vehicle;
a policy information recording step, for recording policy information, which is restriction rules to be applied to commands for operating said application of software, each of which is defined for each of places where said information on processing apparatus is used; and
an in-running operation acceptance/denial list producing step, for producing an in-running operation acceptance/denial list indicative of whether a command for said application software can be operated or not, during the time when said vehicle is running, by referring to said policy information and a command list, which is a list of a display title or an alternate title of the command of said application software, which is displayed after changing a screen, when the screen is switched over by an instruction for changing screen.

11. The operating method, as is described in the claim 10, further comprising the following steps of:
a voice input step, for inputting voice data, where a user speaks;
a text converting step, for analyzing said voice data, so as to convert into text data; and
a command execution acceptance/denial determining step, for determining if the command spoken by said user can be operated or not, during the time when said vehicle is running, which is recorded as said text data, by referring to said text data and said in-running operation acceptance/denial list.

12. The operating method, as is described in the claim 11, wherein said command execution acceptance/denial determining step determines a degree of likeliness between a title of the command, which is included in said in-running operation acceptance/denial list, and the text data, which is converted from said voice data.

13. The operating method, as is described in the claim 10, further comprising an application controlling part for nullifying a button corresponding to the command, which cannot be operated, by using the in-running operation acceptance/denial list, which is produced in said in-running operation acceptance denial list producing portion.

14. The operating method, as is described in the claim 10, wherein the list of the command to be operated from said application software is produced, by extracting a title of a button for use of operation, which is displayed on a screen of said application software.

15. The operating method, as is described in the claim 10, further comprising:
a user information obtaining step, for obtaining user information relating to a language used by said user; and
an equipment information obtaining step, for obtaining equipment information relating to an area where said information processing apparatus is used.

16. The operating method, as is described in the claim 10, further comprising:
an application authenticating step, for authenticating said application software, wherein
said command execution acceptance/denial determining protion does not bring the application software, which is authenticated in said application authenticating porting, to be un-executable.

17. The operating method, as is described in the claim 10, wherein said information processing apparatus is a car navigation system.

18. The operating method, as is described in the claim 10, wherein said information processing apparatus is a portable telephone terminal.

19. An operating system, in which an information processing apparatus, to be mounted on a vehicle, for conducting an operation of application software, during time when said vehicle is running, and a policy distributing server are connected with, through a communication network, wherein:
said information processing apparatus, comprises:
a policy information recording portion, which is configured to record policy information, being information relating to operation, which is inhibited from being executed during the time when said vehicle is running; and
an information obtaining portion, which is configured to obtain information relating to said information processing apparatus;
said policy distributing server, comprises:
a server communicating part, which communicates with said information processing apparatus;
a restriction rule recording portion, which is configured to record a restriction rule, being defined for each place where said information processing apparatus is used, to be applied to the command for operating said application software; and
a restriction rule selector portion, which is configured to select said restriction rule relating with said information processing apparatus;
wherein said information processing apparatus transmits information relating with said information processing apparatus, to said policy distributing server, by using said information processing apparatus communicating part,
the restriction rule selector portion of said policy distributing server selects restriction rule, upon basis of information relating with said information processing apparatus, which is received from said information processing apparatus, by using said server communicating part,
said policy distributing server transmits said restriction rule to said information processing apparatus, as the policy information, by using said server communicating part, and
said information processing apparatus receives the policy information transmitted from said policy distributing server, by using said information processing apparatus communicating part.

* * * * *